US012592049B2

(12) United States Patent (10) Patent No.: US 12,592,049 B2
Yoon et al. (45) Date of Patent: Mar. 31, 2026

(54) ELECTRONIC DEVICE AND METHOD FOR DISPLAYING IMAGE IN VIRTUAL ENVIRONMENT

(71) Applicant: SAMSUNG ELECTRONICS CO., LTD., Suwon-si (KR)

(72) Inventors: Jihyeok Yoon, Suwon-si (KR); Sungoh Kim, Suwon-si (KR); Jihyun Kim, Suwon-si (KR); Jongpil Park, Suwon-si (KR); Donghyun Yeom, Suwon-si (KR); Donghoon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 133 days.

(21) Appl. No.: 18/443,961

(22) Filed: Feb. 16, 2024

(65) Prior Publication Data

US 2024/0362876 A1 Oct. 31, 2024

Related U.S. Application Data

(63) Continuation of application No. PCT/KR2024/095073, filed on Feb. 5, 2024.

(30) Foreign Application Priority Data

Apr. 26, 2023 (KR) ........................ 10-2023-0054868
May 30, 2023 (KR) ........................ 10-2023-0068947

(51) Int. Cl.
*G06T 19/20* (2011.01)
*G06T 19/00* (2011.01)
(52) U.S. Cl.
CPC ............ *G06T 19/20* (2013.01); *G06T 19/006* (2013.01); *G06T 2219/2008* (2013.01); *G06T 2219/2016* (2013.01)

(58) Field of Classification Search
CPC .................. G06T 19/20; G06T 19/006; G06T 2219/2008; G06T 2219/2016; H04N 7/157; G06F 3/011
See application file for complete search history.

(56) References Cited

U.S. PATENT DOCUMENTS 8,878,877 B2 11/2014 Bhosale et al.
10,599,184 B2 3/2020 Kim et al.
(Continued)

FOREIGN PATENT DOCUMENTS

CN 116018803 A * 4/2023 ............ H04M 3/568
JP 5775323 B2 7/2015
(Continued)

OTHER PUBLICATIONS

Search Report and Written Opinion dated May 27, 2024 issued in International Patent Application No. PCT/KR2024/095073.

*Primary Examiner* — Chong Wu
(74) *Attorney, Agent, or Firm* — Nixon & Vanderhye P.C.

(57) ABSTRACT

An electronic device includes memory storing instructions, a display and at least one processor comprising processing circuitry. The instructions, when executed by the at least one processor individually and/or collectively, cause the electronic device to: obtain, from an external electronic device providing a virtual environment, information on a space of the virtual environment in which an avatar is to be located, information on a situation related to the space, and information on body proportion of avatars located in the space; identify, first proportion information of an avatar defined in the space, second proportion information of an avatar defined in the situation, and third proportion information used by the avatars; identify a priority with respect to proportions for the avatars, and display the avatar having a second proportion changed from a first proportion in the space, based on the priority.

20 Claims, 20 Drawing Sheets

(56)     References Cited

U.S. PATENT DOCUMENTS

| | | |
|---|---|---|
| 11,380,039 B2 | 7/2022 | Miller, IV |
| 11,461,949 B2 | 10/2022 | Choi |
| 2011/0164059 A1 | 7/2011 | Bhosale et al. |
| 2018/0329604 A1 | 11/2018 | Nakabo et al. |
| 2022/0036621 A1 | 2/2022 | Kondoh et al. |
| 2023/0026123 A1 | 1/2023 | Lim |
| 2023/0290031 A1 * | 9/2023 | Miller, IV et al. |
| 2024/0202245 A1 * | 6/2024 | Mahadevan ...... G06F 16/90328 |

FOREIGN PATENT DOCUMENTS

| | | |
|---|---|---|
| KR | 10-2020-0096617 | 8/2020 |
| KR | 10-2476296 | 12/2022 |
| WO | 2016/118369 | 7/2016 |

* cited by examiner 1051               1053               1055

1200

1250

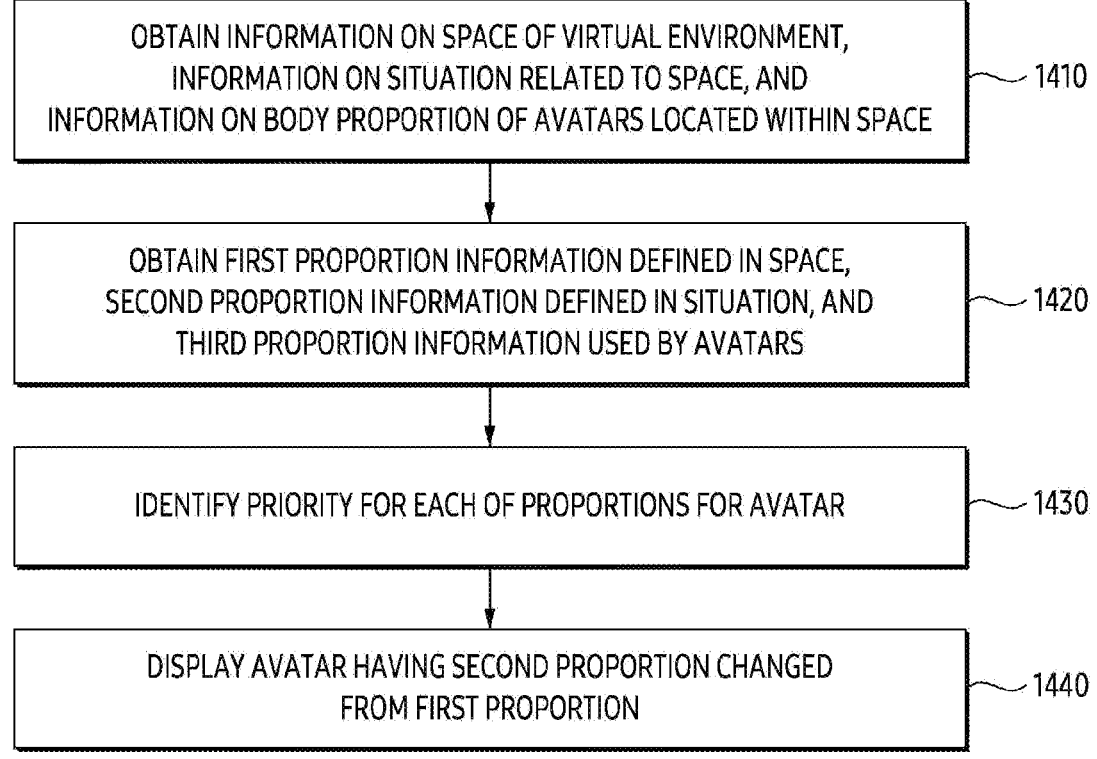

OBTAIN INFORMATION ON SPACE OF VIRTUAL ENVIRONMENT, INFORMATION ON SITUATION RELATED TO SPACE, AND INFORMATION ON BODY PROPORTION OF AVATARS LOCATED WITHIN SPACE ~1410

OBTAIN FIRST PROPORTION INFORMATION DEFINED IN SPACE, SECOND PROPORTION INFORMATION DEFINED IN SITUATION, AND THIRD PROPORTION INFORMATION USED BY AVATARS ~1420

IDENTIFY PRIORITY FOR EACH OF PROPORTIONS FOR AVATAR ~1430

DISPLAY AVATAR HAVING SECOND PROPORTION CHANGED FROM FIRST PROPORTION ~1440

FIG. 14

ELECTRONIC DEVICE AND METHOD FOR DISPLAYING IMAGE IN VIRTUAL ENVIRONMENT

CROSS-REFERENCE TO RELATED APPLICATIONS

This application is a continuation of International Application No. PCT/KR2024/095073 designating the United States, filed on Feb. 5, 2024, in the Korean Intellectual Property Receiving Office and claiming priority to Korean Patent Application Nos. 10-2023-0054868, filed on Apr. 26, 2023, and 10-2023-0068947, filed on May 30, 2023, in the Korean Intellectual Property Office, the disclosures of each of which are incorporated by reference herein in their entireties.

BACKGROUND

Field

The disclosure relates to an electronic device and a method for displaying an image in a virtual environment.

Description of Related Art

In order to provide an enhanced user experience, an electronic device that provides an augmented reality (AR) service that displays information generated by a computer in association with an external object in the real-world are being developed. The augmented reality may be referred to as a virtual environment. The electronic device may include a wearable device that may be worn by a user. For example, the electronic device may include user equipment, AR glasses, and/or a head-mounted device (HMD).

SUMMARY

According to an example embodiment, an electronic device may comprise memory storing instructions. The electronic device may comprise a display. The electronic device may comprise at least one processor comprising processing circuitry. The instructions, when executed by at least one processor individually and/or collectively, may cause the electronic device to obtain, from an external electronic device providing a virtual environment, information on a space of the virtual environment in which an avatar is to be located, information on a situation related to the space, and information on body proportion of avatars located in the space. The instructions, when executed by at least one processor individually and/or collectively, may cause the electronic device to identify, first proportion information of an avatar defined in the space, second proportion information of an avatar defined in the situation, and third proportion information used by the avatars based on the information on the space, the information on the situation, and the information on the body proportion of the avatars. The instructions, when executed by at least one processor individually and/or collectively, may cause the electronic device to identify a priority with respect to proportions for the avatars based on the first proportion information, the second proportion information, and the third proportion information. The instructions, when executed by at least one processor individually and/or collectively, may cause the electronic device to display, through the display, the avatar having a second proportion changed from a first proportion in the space, based on the priority.

According to an example embodiment, a method performed by an electronic device may comprise: obtaining, from an external electronic device providing a virtual environment, information on a space of the virtual environment in which an avatar is to be located, information on a situation related to the space, and information on body proportion of avatars located in the space. The method may comprise identifying, first proportion information of an avatar defined in the space, second proportion information of an avatar defined in the situation, and third proportion information used by the avatars based on the information on the space, the information on the situation, and the information on the body proportion of the avatars. The method may comprise identifying a priority with respect to proportions for the avatars based on the first proportion information, the second proportion information, and the third proportion information. The method may comprise displaying, through the display of the electronic device, the avatar having a second proportion changed from a first proportion in the space, based on the priority.

According to an example embodiment, a non-transitory computer-readable storage medium may store one or more programs including instructions that when executed by at least one processor, individually and/or collectively, of an electronic device, cause the electronic device to: obtain, from an external electronic device providing a virtual environment, information on a space of the virtual environment in which an avatar is to be located, information on a situation related to the space, and information on body proportion of avatars located in the space; identify, first proportion information of an avatar defined in the space, second proportion information of an avatar defined in the situation, and third proportion information used by the avatars based on the information on the space, the information on the situation, and the information on the body proportion of the avatars; identify a priority with respect to proportions for the avatars based on the first proportion information, the second proportion information, and the third proportion information; and display, through a display of the electronic device, the avatar having a second proportion changed from a first proportion in the space, based on the priority.

BRIEF DESCRIPTION OF THE DRAWINGS

The above and other aspects, features and advantages of certain embodiments of the present disclosure will be more apparent from the following detailed description, take in conjunction with the accompanying drawings, in which:

FIG. 14 is a flowchart illustrating an example method of displaying an avatar having an adjusted proportion based on a space, a situation, and avatars of a virtual environment according to various embodiments.

DETAILED DESCRIPTION

Terms used in the present disclosure are used simply to describe various example embodiments, and may are not intended to limit the scope of any embodiment. A singular expression may include a plural expression unless it is clearly meant differently in the context. The terms used herein, including a technical or scientific term, may have the same meaning as generally understood by a person having ordinary knowledge in the technical field described in the present disclosure. Terms defined in a general dictionary among the terms used in the present disclosure may be interpreted with the same or similar meaning as a contextual meaning of related technology, and unless clearly defined in the present disclosure, it is not interpreted in an ideal or excessively formal meaning. In some cases, even terms defined in the present disclosure should not be interpreted to exclude embodiments of the present disclosure.

In various embodiments of the present disclosure described below, a hardware approach is described as an example. However, since the various embodiments of the present disclosure include technology that use both hardware and software, the various embodiments of the present disclosure do not exclude a software-based approach.

In addition, in the present disclosure, in order to determine whether a specific condition is satisfied or fulfilled, an expression of more than or less than may be used, but this is only a description for expressing an example, and does not exclude description of more than or equal to or less than or equal to. A condition described as 'more than or equal to' may be replaced with ' more than', a condition described as 'less than or equal to' may be replaced with 'less than', and a condition described as 'more than or equal to and less than' may be replaced with 'more than and less than or equal to'. In addition, hereinafter, 'A' to 'B' may refer, for example, to at least one of elements from A (including A) and to B (including B).

Figure 1:
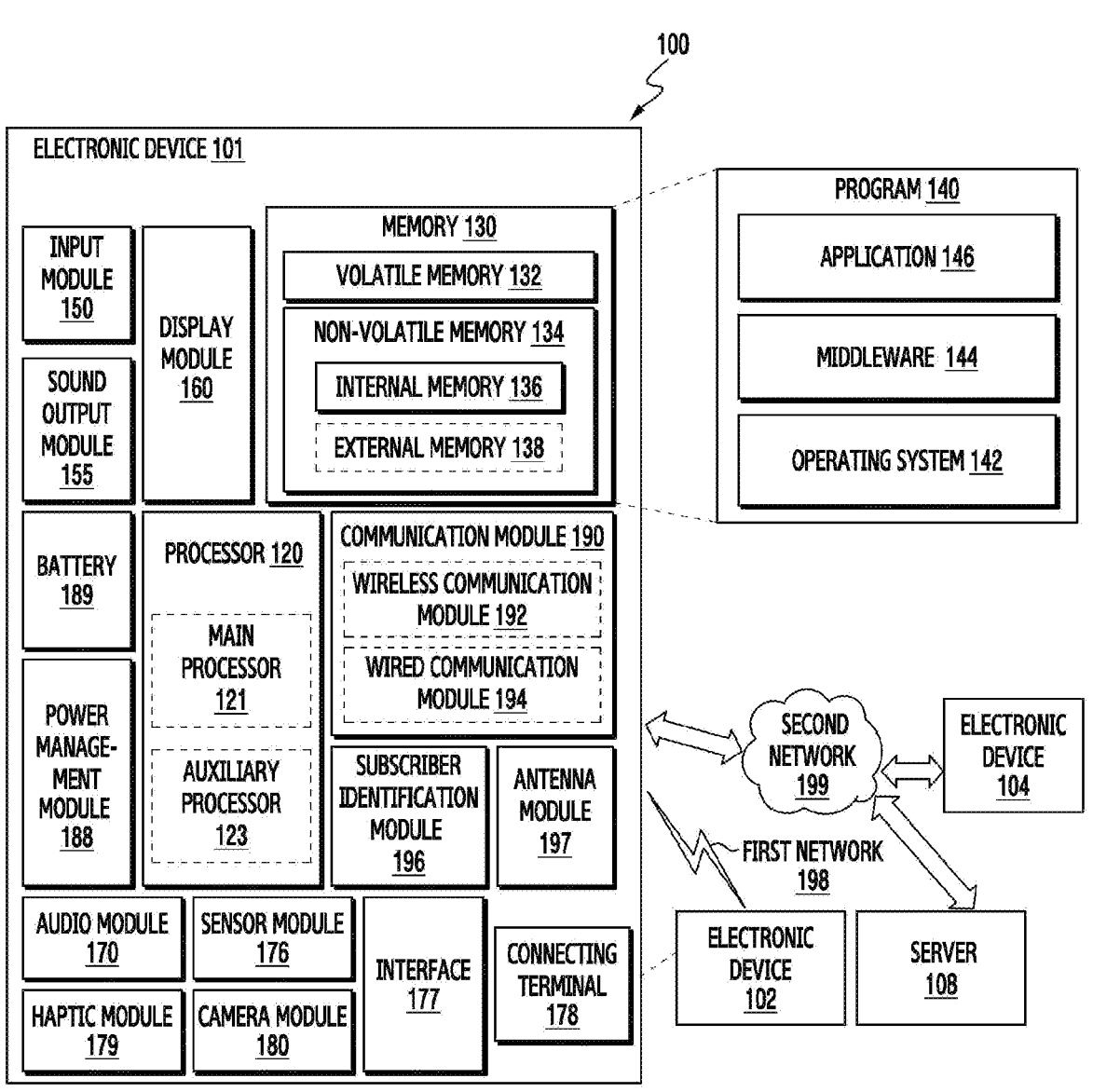
FIG. 1 is a block diagram illustrating an example electronic device in a network environment according to various embodiments.

FIG. 1 is a block diagram illustrating an example electronic device in a network environment according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
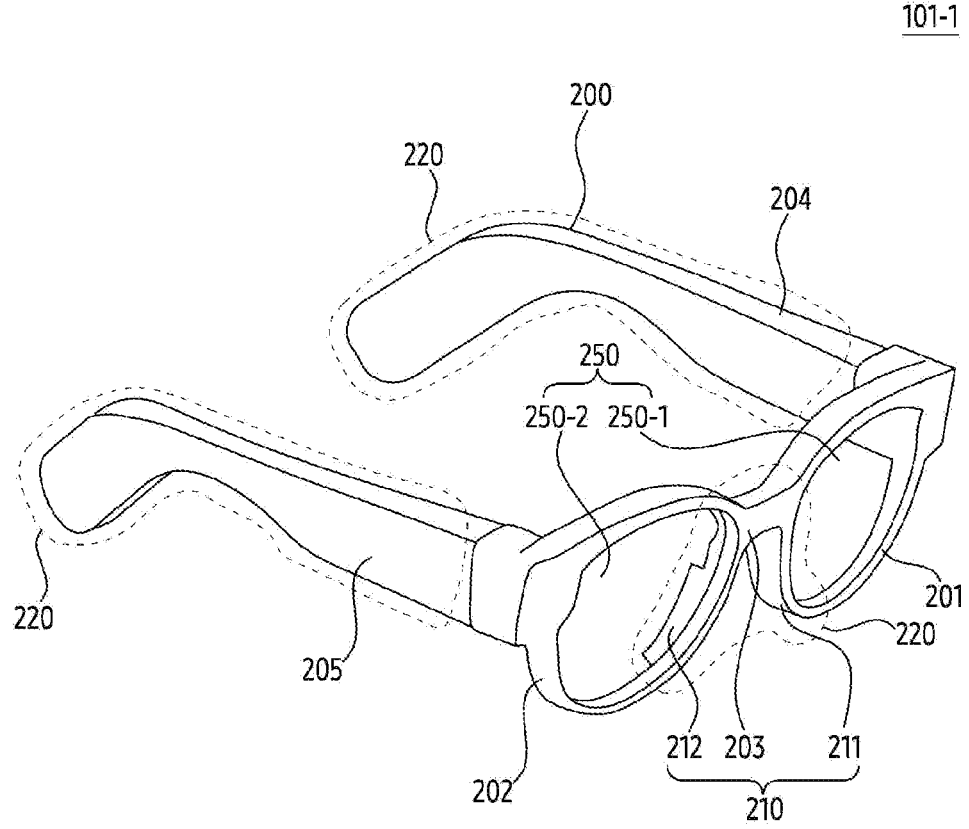
FIG. 2A is a perspective view of illustrating an example wearable device according to various embodiments.
Figure 2B:
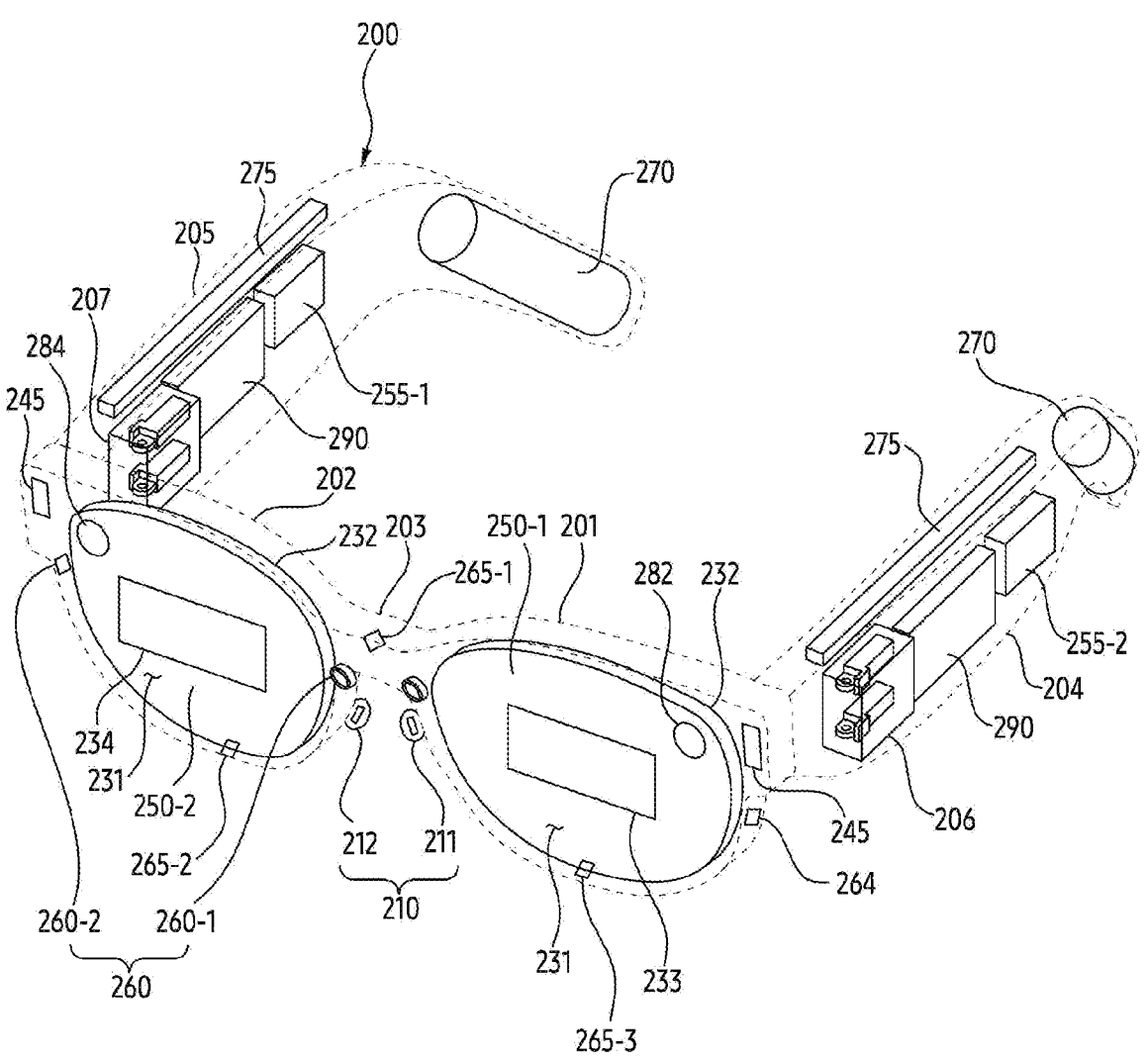
FIG. 2B is a perspective view illustrating an example configuration of a wearable device according to various embodiments.

FIG. 2A is a perspective view illustrating an example wearable device according to various embodiments. FIG. 2B is a perspective view illustrating an example hardware configuration of a wearable device according to various embodiments.

According to an embodiment, a wearable device 101-1 may have a shape of glasses which is wearable on a user's body part (e.g., head). The wearable device 101-1 of FIGS. 2A and 2B may be an example of an electronic device 101 of FIG. 1. The wearable device 101-1 may include a head mounted display (HMD). For example, a housing of the wearable device 101-1 may include a flexible material such as rubber and/or silicone which has a shape which closely adheres to a portion of the user's head (e.g., a portion of the face surrounding two eyes). For example, the housing of wearable device 101-1 may include one or more straps which are able to be twined around the user's head, and/or one or more temples attachable to ears of the head.

Referring to FIG. 2A, according to an embodiment, the wearable device 101-1 may include at least one display 250 and a frame 200 supporting the at least one display 250.

According to an embodiment, the wearable device 101-1 may be worn on a portion of the user's body. The wearable device 101-1 may provide augmented reality (AR), virtual reality (VR), or mixed reality (MR) in which augmented reality and virtual reality are mixed, to a user wearing the wearable device 101-1. For example, the wearable device 101-1 may display a virtual reality image provided from at least one optical device 282 and 284 of FIG. 2B on the at least one display 250 in response to a user's designated gesture obtained through motion recognition cameras 260-2 and 264 of FIG. 2B. For example, the display 250 may include at least a portion of a display module 160 of FIG. 1.

According to an embodiment, the at least one display 250 may provide visual information to the user. For example, the at least one display 250 may include a transparent or translucent lens. The at least one display 250 may include a first display 250-1 and/or a second display 250-2 spaced apart from the first display 250-1. For example, the first display 250-1 and the second display 250-2 may be disposed at locations corresponding to the user's left eye and right eye, respectively.

Referring to FIG. 2B, the at least one display 250 may provide visual information transmitted from ambient light to the user through a lens included in the at least one display 250, and other visual information that is distinct from the visual information. The lens may be formed based on at least one of a Fresnel lens, a pancake lens, or a multi-channel lens. For example, the at least one display 250 may include a first surface 231 and a second surface 232 opposite to the first surface 231. A display area may be formed on the second surface 232 of the at least one display 250. When the user wears the wearable device 101-1, the ambient light may be transmitted to the user, by being incident on the first surface 231 and penetrated through the second surface 232. For another example, the at least one display 250 may display an augmented reality image in which the virtual reality image provided from the at least one optical device 282 and 284 is combined on a reality screen transmitted through the ambient light on the display area formed on the second surface 232.

In an embodiment, the at least one display 250 may include at least one waveguide 233 and 234 that diffracts light transmitted from the at least one optical device 282 and 284 and transmits it to the user. The at least one waveguide 233 and 234 may be formed based on at least one of glass, plastic, or polymer. A nano pattern may be formed on at least a portion of the outside or inside of the at least one waveguide 233 and 234. The nano pattern may be formed based on a grating structure having a polygonal and/or curved surface shape. Light incident to an end of the at least one waveguide 233 and 234 may propagate to another end of the at least one waveguide 233 and 234 by the nano pattern. The at least one waveguide 233 and 234 may include at least one of at least one diffractive element (e.g., a diffractive optical element (DOE), a holographic optical element (HOE)), and a reflective element (e.g., a reflective mirror). For example, the at least one waveguide 233 and 234 may be disposed within the wearable device 101-1 to guide a screen displayed by the at least one display 250 to the user's eyes. For example, the screen may be transmitted to the user's eyes based on total internal reflection (TIR) generated within the at least one waveguide 233 and 234.

The wearable device 101-1 may be displayed on the at least one display 250, by analyzing an object included in a real image collected through a photographing camera 245 and combining a virtual object corresponding to an object subject to augmented reality provision among the analyzed object. The virtual object may include at least one of text and images on various information related to the object included in the real image. The wearable device 101-1 may analyze an object based on a multi-camera such as a stereo camera. For the object analysis, the wearable device 101-1 may execute simultaneous localization and mapping (SLAM) using the multi-camera, inertial measurement units (IMU) (or IMU sensor), and/or a time-of-flight (ToF). The user wearing the wearable device 101-1 may watch an image displayed on the at least one display 250.

According to an embodiment, the frame 200 may be made of a physical structure in which the wearable device 101-1 may be worn on the user's body. According to an embodiment, the frame 200 may be configured such that when the user wears the wearable device 101-1, the first display 250-1 and the second display 250-2 may be located at the locations corresponding to the user's left eye and right eye. The frame 200 may support at least one display 250. For example, the frame 200 may support the first display 250-1 and the second display 250-2 to be located at the locations corresponding to the user's left eye and right eye.

Referring to FIG. 2A, in case that the user wears the wearable device 101-1, the frame 200 may include an area 220 at least partially in contact with the portion of the user's body. For example, the area 220 in contact with the portion of the user's body of the frame 200 may include an area in contact with a portion of the user's nose, a portion of the user's ear, and a portion of the side surface of the user's face that the wearable device 101-1 is contact with. According to an embodiment, the frame 200 may include a nose pad 210 that is contacted on the portion of the user's body. When the wearable device 101-1 is worn by the user, the nose pad 210 may be contacted on the portion of the user's nose. The frame 200 may include a first temple 204 and a second temple 205 that are contacted on another portion of the user's body that is distinct from the portion of the user's body.

For example, the frame 200 may include a first rim 201 surrounding at least a portion of the first display 250-1, a second rim 202 surrounding at least a portion of the second display 250-2, a bridge 203 disposed between the first rim 201 and the second rim 202, a first pad 211 disposed along a portion of a periphery of the first rim 201 from an end of the bridge 203, a second pad 212 disposed along a portion of a periphery of the second rim 202 from another end of the bridge 203, the first temple 204 extending from the first rim 201 and fixed to a portion of a wearer's ear, and the second temple 205 extending from the second rim 202 and fixed to a portion of an ear opposite the ear. The first pad 211 and the second pad 212 may be in contact with the portion of the user's nose, and the first temple 204 and the second temple 205 may be in contact with a portion of the user's face and a portion of the ear. The temples 204 and 205 may be rotatably connected to the rim through hinge units 206 and 207 of FIG. 2B. The first temple 204 may be rotatably connected with respect to the first rim 201 through the first hinge unit 206 disposed between the first rim 201 and the first temple 204. The second temple 205 may be rotatably connected with respect to the second rim 202 through the second hinge unit 207 disposed between the second rim 202 and the second temple 205. According to an embodiment, the wearable device 101-1 may identify an external object (e.g., a user's fingertip) touching the frame 200, and/or a gesture performed by the external object, by using a touch sensor, a grip sensor, and/or a proximity sensor formed on at least a portion of a surface of the frame 200.

According to an embodiment, the wearable device 101-1 may include hardware that performs various functions (e.g., hardware to be described in greater detail below based on a block diagram of FIG. 5). For example, the hardware may include a battery module 270, an antenna module 275, the at least one optical device 282 and 284, speakers (e.g., speakers 255-1 and 255-2), a microphone (e.g., microphones 265-1, 265-2, and 265-3), a light emitting module (not illustrated), and/or a printed circuit board (PCB) 290 (e.g., a printed circuit board). Various hardware may be disposed within the frame 200.

According to an embodiment, the microphone (e.g., the microphones 265-1, 265-2, and 265-3) of the wearable device 101-1 may obtain a sound signal by being disposed in at least a portion of the frame 200. Although the first microphone 265-1 disposed on the bridge 203, the second microphone 265-2 disposed on the second rim 202 and the third microphone 265-3 disposed on the first rim 201 are illustrated in FIG. 2B, the number and disposition of microphones 265 are not limited to the embodiment of FIG. 2B. In case that the number of the microphones 265 included in the wearable device 101-1 is two or more, the wearable device 101-1 may identify a direction of the sound signal using a plurality of microphones disposed on different portions of the frame 200.

According to an embodiment, the at least one optical device 282 and 284 may project the virtual object on the at least one display 250 in order to provide various image information to the user. For example, the at least one optical device 282 and 284 may be a projector. The at least one optical device 282 and 284 may be disposed adjacent to the at least one display 250 or may be included within the at least one display 250 as a portion of the at least one display 250. According to an embodiment, the wearable device 101-1 may include the first optical device 282 corresponding to the first display 250-1 and the second optical device 284 corresponding to the second display 250-2. For example, the at least one optical device 282 and 284 may include the first optical device 282 disposed at a periphery of the first display 250-1 and the second optical device 284 disposed at a periphery of the second display 250-2. The first optical device 282 may transmit light to the first wave guide 233 disposed on the first display 250-1, and the second optical device 284 may transmit light to the second wave guide 234 disposed on the second display 250-2.

In an embodiment, a camera 260 may include the photographing camera 245, an eye tracking camera (ET camera) 260-1, and/or the motion recognition camera 260-2. The photographing camera 245, the eye tracking camera (ET camera) 260-1, and the motion recognition cameras 260-2 and 264 may be disposed at different locations on the frame 200 and may perform different functions. The eye tracking camera (ET camera) 260-1 may output data indicating a gaze of the user wearing the wearable device 101-1. For example, the wearable device 101-1 may detect the gaze from an image including user's pupils obtained through the eye tracking camera (ET camera) 260-1. An example in which the eye tracking camera (ET camera) 260-1 is disposed toward the user's right eye is illustrated in FIG. 2B, but the embodiment is not limited thereto, and the eye tracking camera (ET camera) 260-1 may be disposed alone toward the user's left eye or may be disposed toward two eyes.

In an embodiment, the photographing camera 245 may photograph a real image or background to be matched with a virtual image to implement augmented reality or mixed reality content. The photographing camera 245 may photograph an image of a specific object existing at a location viewed by the user and may provide the image to the at least one display 250. The at least one display 250 may display one image in which information on an actual image or background including the image of the specific object obtained using the photographing camera 245 and a virtual image provided through the at least one optical device 282 and 284 overlap. In an embodiment, the photographing camera 245 may be disposed on the bridge 203 disposed between the first rim 201 and the second rim 202.

The eye tracking camera (ET camera) 260-1 may implement more realistic augmented reality by matching the user's gaze with the visual information provided to the at least one display 250 by tracking the gaze of the user wearing the wearable device 101-1. For example, when the user looks at a front, the wearable device 101-1 may naturally display environment information related to the front of the user on the at least one display 250 at a place where the user is located. The eye tracking camera (ET camera) 260-1 may be configured to capture an image of the user's pupil in order to determine the user's gaze. For example, the eye tracking camera (ET camera) 260-1 may receive gaze detection light reflected from the user's pupil and may track the user's gaze based on the location and movement of the received gaze detection light. In an embodiment, the eye tracking camera (ET camera) 260-1 may be disposed at the locations corresponding to the user's left eye and right eye. For example, the eye tracking camera (ET camera) 260-1 may be disposed to face a direction in which the user wearing the wearable device 101-1 is located within the first rim 201 and/or the second rim 202.

The motion recognition cameras 260-2 and 264 may provide a specific event to a screen provided on the at least one display 250 by recognizing the movement of all or portion of the user's body, such as the user's torso, hand, or face. The motion recognition cameras 260-2 and 264 may obtain a signal corresponding to the gesture by recognizing the user's gesture, and may provide a display corresponding to the signal to the at least one display 250. The processor may identify a signal corresponding to the gesture and may perform a designated function based on the identification. In an embodiment, the motion recognition cameras 260-2 and 264 may be disposed on the first rim 201 and/or the second rim 202.

The camera 260 included in the wearable device 101-1 is not limited to the eye tracking camera (ET camera) 260-1 and the motion recognition cameras 260-2 and 264 described above. For example, the wearable device 101-1 may identify an external object included in the FoV using the camera 260 disposed toward the user's FoV. That the wearable device 101-1 identifies the external object may be performed based on a sensor for identifying a distance between the wearable device 101-1 and the external object, such as a depth sensor and/or a time of flight (ToF) sensor. The camera 260 disposed toward the FoV may support an autofocus function and/or an optical image stabilization (OIS) function. For example, the wearable device 101-1 may include the camera 260 (e.g., a face tracking (FT) camera) disposed toward the face in order to obtain an image including the face of the user wearing the wearable device 101-1.

Although not illustrated, according to an embodiment, the wearable device 101-1 may further include a light source (e.g., LED) that emits light toward a subject (e.g., the user's eye, face, and/or and external object in FoV) photographed using the camera 260. The light source may include an LED having an infrared wavelength. The light source may be disposed on at least one of the frame 200 and the hinge units 206 and 207.

According to an embodiment, the battery module 270 may supply power to electronic components of the wearable device 101-1. In an embodiment, the battery module 270 may be disposed within the first temple 204 and/or the second temple 205. For example, the battery module 270 may be a plurality of battery modules 270. The plurality of battery modules 270 may be disposed on each of the first temple 204 and the second temple 205. In an embodiment, the battery module 270 may be disposed at an end of the first temple 204 and/or the second temple 205.

The antenna module 275 may transmit a signal or power to the outside of the wearable device 101-1, or may receive the signal or power from the outside. In an embodiment, the antenna module 275 may be disposed within the first temple 204 and/or the second temple 205. For example, the antenna module 275 may be disposed close to a surface of the first temple 204 and/or the second temple 205.

A speaker 255 may output the sound signal to the outside of the wearable device 101-1. The sound output module may be referred to as a speaker. In an embodiment, the speaker 255 may be disposed within the first temple 204 and/or the second temple 205 in order to be disposed adjacent to the ear of the user wearing the wearable device 101-1. For example, the speaker 255 may include the second speaker 255-2 disposed adjacent to the user's left ear by being disposed within the first temple 204, and the first speaker 255-1 disposed adjacent to the user's right ear by being disposed within the second temple 205.

The light emitting module (not illustrated) may include at least one light emitting element. In order to visually provide information on a specific state of the wearable device 101-1, the light emitting module may emit light of a color corresponding to the specific state or may emit light in an operation corresponding to the specific state. For example, in case that the wearable device 101-1 requires charging, it may emit red light at regular intervals. In an embodiment, the light emitting module may be disposed on the first rim 201 and/or the second rim 202.

Referring to FIG. 2B, according to an embodiment, the wearable device 101-1 may include the printed circuit board (PCB) 290. The PCB 290 may be included in at least one of the first temple 204 and the second temple 205. The PCB 290 may include an interposer disposed between at least two sub-PCBs. On the PCB 290, one or more hardware included in the wearable device 101-1 (e.g., hardware illustrated by different blocks of FIG. 5) may be disposed. The wearable device 101-1 may include a flexible PCB (FPCB) for interconnecting the hardware.

According to an embodiment, the wearable device 101-1 may include at least one of a gyro sensor, a gravity sensor, and/or an acceleration sensor for detecting a posture of the wearable device 101-1 and/or a posture of the user's body part (e.g., the head) wearing the wearable device 101-1. Each of the gravity sensor and the acceleration sensor may measure gravity acceleration and/or acceleration based on designated three-dimensional axes (e.g., x-axis, y-axis, and z-axis) perpendicular to each other. The gyro sensor may measure an angular velocity of each of the designated three-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 101-1 may identify a user's motion and/or gesture performed to execute or stop a specific function of the wearable device 101-1 based on the IMU.

Figure 3A:
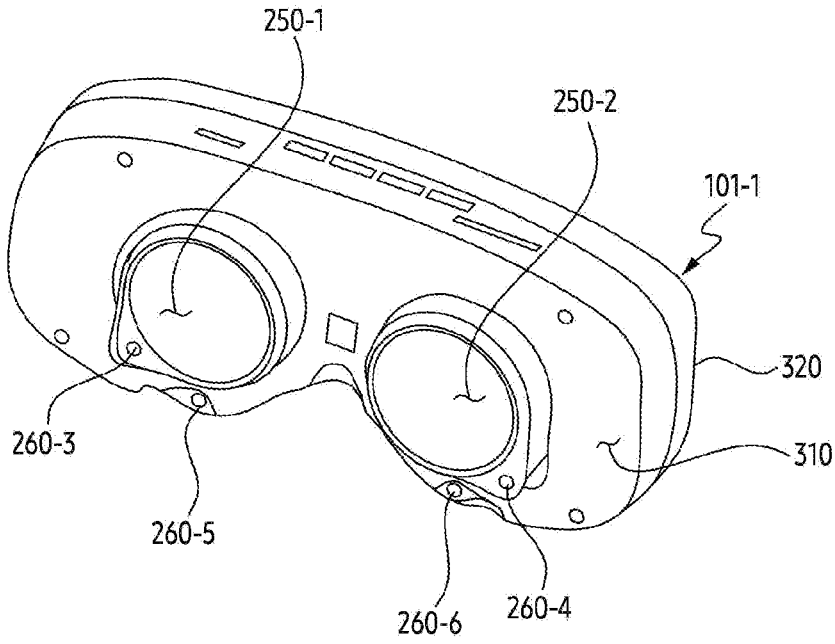
FIGS. 3A and 3B are rear and front perspective views, respectively illustrating an example of an appearance of a wearable device according to various embodiments.
Figure 3B:
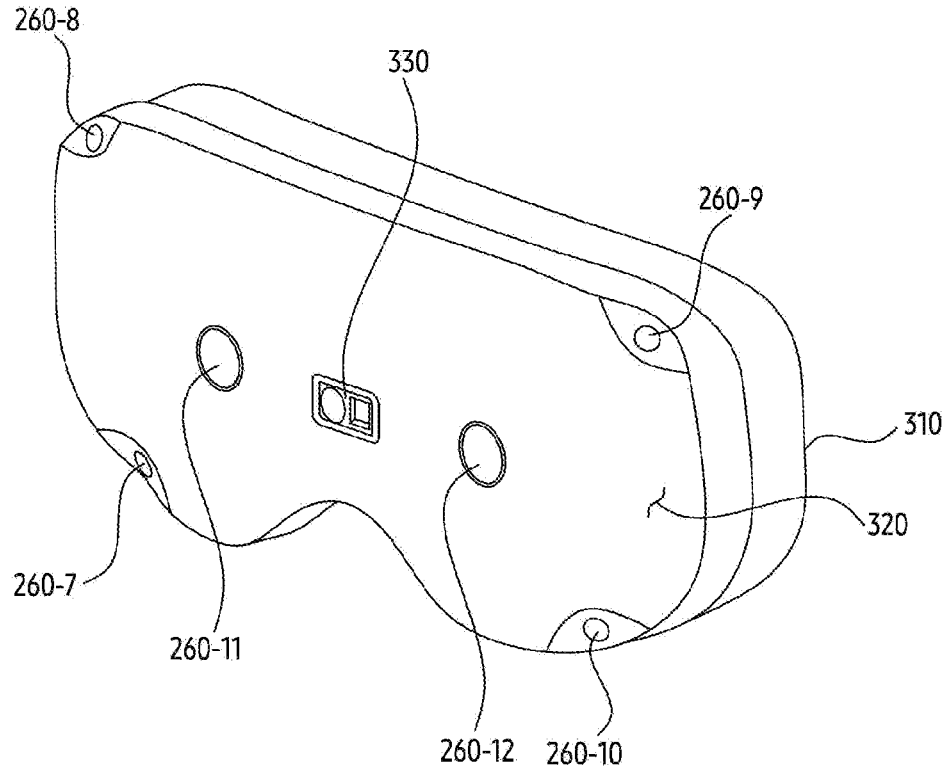

FIGS. 3A and 3B are rear and front perspective views, respectively, illustrating an example of an appearance of a wearable device according to various embodiments.

A wearable device 101-1 of FIGS. 3A and 3B may be an example of an electronic device 101 of FIG. 1. According to an embodiment, an example of an appearance of a first surface 310 of a housing of the wearable device 101-1 may be illustrated in FIG. 3A, and an example of an appearance of a second surface 320 opposite to the first surface 310 may be illustrated in FIG. 3B.

Referring to FIG. 3A, according to an embodiment, the first surface 310 of the wearable device 101-1 may have a shape that is attachable on a user's body part (e.g., a user's face). Although not illustrated, the wearable device 101-1 may further include a strap for fixing on the user's body part, and/or one or more temples (e.g., a first temple 204 and/or a second temple 205 of FIGS. 2A and 2B). A first display 250-1 for outputting an image to a left eye among two eyes of the user, and a second display 250-2 for outputting the image to a right eye among the two eyes may be disposed on the first surface 310. The wearable device 101-1 may further include rubber or silicon packing for preventing and/or reducing interference by light (e.g., ambient light) formed on the first surface 310 and different from light emitted from the first display 250-1 and the second display 250-2.

According to an embodiment, the wearable device 101-1 may include cameras 260-3 and 260-4 for photographing and/or tracking two eyes of a user adjacent to each of the first display 250-1 and the second display 250-2. For example, the cameras 260-3 and 260-4 may be referred to as ET cameras. According to an embodiment, the wearable device 101-1 may include cameras 260-5 and 260-6 for photographing and/or recognizing the user's face. The cameras 260-5 and 260-6 may be referred to as FT cameras.

Referring to FIG. 3B, a camera (e.g., cameras 260-7, 260-8, 260-9, 260-10, 260-11, and 260-12), and/or a sensor (e.g., a depth sensor 330) for obtaining information related to an external environment of the wearable device 101-1 may be disposed on the second surface 320 opposite to the first surface 310 of FIG. 3A. For example, the cameras 260-7, 260-8, 260-9, and 260-10 may be disposed on the second surface 320 to recognize an external object. For example, using the cameras 260-11 and 260-12, the wearable device 101-1 may obtain an image and/or video to be transmitted to each of the user's two eyes. The camera 260-11 may be disposed on the second surface 320 of the wearable device 101-1 to obtain an image to be displayed through the second display 250-2 corresponding to the right eye among the two eyes. The camera 260-12 may be disposed on the second surface 320 of the wearable device 101-1 to obtain an image to be displayed through the first display 250-1 corresponding to the left eye among the two eyes.

According to an embodiment, the wearable device 101-1 may include the depth sensor 330 disposed on the second surface 320 to identify a distance between the wearable device 101-1 and the external object. Using the depth sensor 330, the wearable device 101-1 may obtain spatial information (e.g., a depth map) on at least a portion of a FoV of a user wearing the wearable device 101-1.

Although not illustrated, a microphone for obtaining a sound output from the external object may be disposed on the second surface 320 of the wearable device 101-1. The number of microphones may be one or more depending on the embodiment.

As described above, according to an embodiment, the wearable device 101-1 may include hardware (e.g., the cameras 260-7, 206-8, 260-9, 260-10, and/or the depth sensor 330) for identifying body parts including a user's hand. The wearable device 101-1 may identify a gesture represented by a motion of the body part. The wearable device 101-1 may provide a UI based on the identified gesture to the user wearing the wearable device 101-1. The UI may support a function for editing the image and/or video stored in the wearable device 101-1. The wearable device 101-1 may communicate with an external electronic device different from the wearable device 101-1 in order to identify the gesture more accurately.

Figure 4:
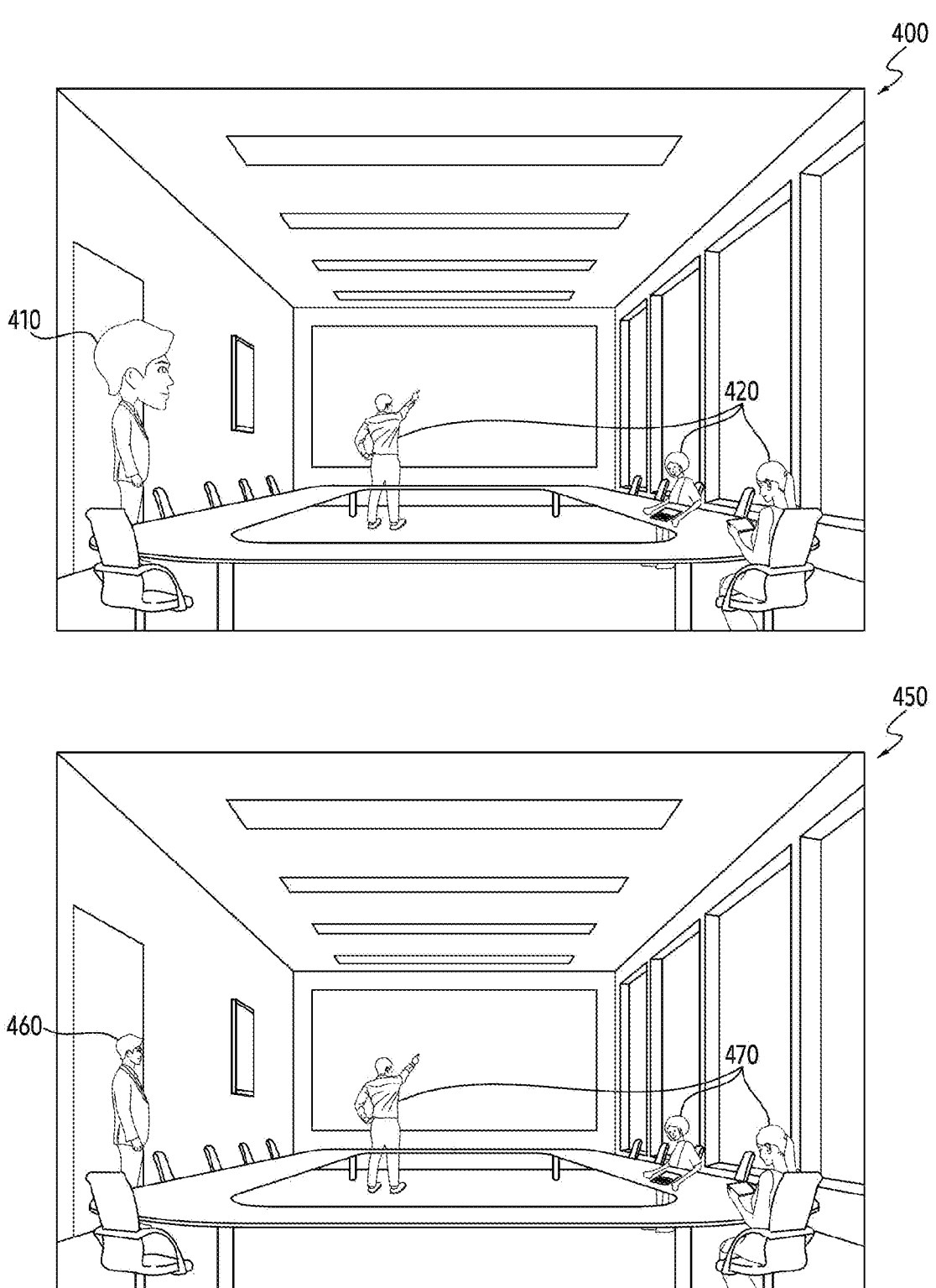
FIG. 4 is a diagram illustrating an example method of adjusting a proportion of an avatar based on a space of a virtual environment according to various embodiments.

FIG. 4 is a diagram illustrating an example method of adjusting a proportion of an avatar based on a space of a virtual environment according to various embodiments.

The virtual environment may indicate an example of extended reality (XR) provided through an electronic device 101 of FIG. 1. For example, the XR may include augmented reality (AR), virtual reality (VR), and mixed reality (MR). For example, the electronic device 101 for the AR may augment and provide information based on an object of reality. For example, the electronic device 101 may include AR glasses or VR glasses for providing the information to a user based on the object of the reality. For example, the electronic device 101 may include a video see-through (VST) device. For example, the electronic device 101 may include a user equipment. For example, the electronic device 101 may include a personal computer (PC). Hereinafter, the electronic device 101 may be referred to as a wearable device (e.g., a wearable device 101-1 of FIGS. 2A, 2B, 3A and 3B).

The space may include a three-dimensional area defined within the virtual environment. For example, the space may be defined by an external electronic device (e.g., a server) for providing the virtual environment. For example, the avatar may include a virtual object corresponding to a user of the electronic device 101 existing within the virtual environment. For example, the virtual environment may include at least one avatar. The proportion may indicate a proportion of the avatar to a body or a portion of the body. For example, the proportion may indicate a proportion of the body to a face of the avatar. Hereinafter, the proportion of the body to the face of the avatar may be referred to as a body proportion. In other words, the proportion may be understood substantially the same as the body proportion. However, the proportion according to an embodiment of the present disclosure is not limited to the body proportion. For example, the proportion may indicate a proportion within a body portion (e.g., the face) of the avatar.

Referring to FIG. 4, examples 400 and 450 of a method of adjusting to have an optimized body proportion of the avatar according to a virtual space within the virtual environment are illustrated. In the example 400 and the example 450, the virtual space may be a meeting room. For example, the example 400 and the example 450 may illustrate a situation in which a meeting is in progress within the virtual space that is the meeting room. The situation may refer to contents progressing in relation to the avatar.

Referring to the example 400, an avatar 410 corresponding to the user of the electronic device 101 may enter the meeting room from another space within the virtual environment. For example, the meeting room may include a plurality of avatars 420 corresponding to different users. For example, the plurality of avatars 420 may be virtual objects (or avatars) represented as an appearance having a first proportion. Hereinafter, a virtual object represented (or formed) with an appearance having a specific proportion may be referred to as an avatar having the specific proportion. On the other hand, the avatar 410 may be an avatar having the second proportion. For example, the first proportion may indicate a proportion in which the proportion of the body to the face of the avatar is greater than or equal to a first value. For example, the second proportion may indicate a proportion in which the proportion of the body to the face of the avatar is less than a second value. For example, the first value may be a value greater than the second value. In other words, the first proportion may indicate a type in which length of the body has a relatively long appearance. The second proportion may indicate a proportion in which the length of the body has a relatively short appearance or a proportion in which the face has an enlarged appearance. In case that the proportion of the body to the face of the avatar is less than the first value and is greater than or equal to the second value, the proportion may be defined as a third proportion. The third proportion may be referred to as a default proportion. However, the present disclosure is not limited thereto. For example, a proportion indicating the body proportion of the avatar may be variously defined. For example, the proportion may include an unrealistic proportion or a realistic proportion classified according to the drawn style. For example, the unrealistic proportion may indicate a style in which a portion of the body are drawn exaggeratedly (e.g., caricaturizing), such as in a cartoon or animation theme. For example, the realistic proportion may indicate a style of drawing the body as it appears. The proportion may be configured with proportions having a range more subdivided than the first proportion, the second proportion, and the third proportion. For example, the proportion may include a fourth proportion in which the proportion of the body to the face of the avatar is greater than or equal to a fourth value greater than the first value.

Referring to the example 450, an avatar 460 corresponding to the user of the electronic device 101 may enter the meeting room from the other space within the virtual environment. For example, the meeting room may include a plurality of avatars 470 corresponding to other users. For example, the plurality of avatars 470 may be an avatar having the first proportion. In addition, the avatar 460 may be the avatar having the first proportion, which is the same as a type of the plurality of avatars 470. The electronic device 101 may display the avatar 460 by adjusting the avatar having the second proportion to the avatar having the first proportion in response to identifying an event indicating that the avatar 460 enters the meeting room. For example, the electronic device 101 may change the avatar having the second proportion to the avatar having the first proportion based on information on a changed space, a situation within the space, and information on the avatars 470 corresponding to users located in the space. For example, the information on the changed space may include information indicating the meeting room. For example, the situation within the space may include information indicating that the meeting is in progress in the meeting room. For example, the information on the avatars 470 corresponding to the users may include proportion information (e.g., the second proportion) of the avatars used by each of the avatars 470. In other words, the electronic device 101 may change or adjust a body proportion of the avatar 460 from the second proportion to the first proportion, based on the information indicating the meeting room, the information indicating that the meeting is in progress, and the information on the body proportions of the avatars 470, in response to the event indicating that the avatar 460 enters the meeting room. For example, the first proportion may be a body proportion that is relatively appropriate compared to the second proportion with respect to the meeting room in which the meeting is in progress.

Referring to examples 400 and 450, in case of a situation of a quiet atmosphere in which the meeting is in progress in the meeting room, it may be appropriate to use an avatar having an appearance of the first proportion rather than the second proportion having an appearance in which the face is enlarged. In other words, even in case that the avatar having the second proportion is used within the virtual environment, when entering the meeting room, displaying the avatar having the first proportion may provide a more immersive user experience to a user using the virtual environment.

Referring to the above description, the body proportions of the avatar were adjusted or a size of an item (e.g., clothes) worn by the avatar was changed according to a user's preference within the virtual environment or a fixed proportion defined within the virtual environment. However, a more natural body proportion of the avatar may exist for each space in the virtual environment. For example, in case that an avatar having a body proportion of a child exists in a space such as a club or bar used by adults, users' sense of immersion may be reduced. In a space such as an amusement park, it may be more natural to use an avatar having an exaggerated body proportion (or the body proportion of the child) to have the enlarged face.

Hereinafter, an electronic device and method for adjusting the proportion (or body proportion) of the avatar based on information related to a space within the virtual environment according to various example embodiments of the present disclosure will be described. The electronic device and method according to various example embodiments of the present disclosure may generate and display an avatar having a body proportion that is flexibly adjusted according to a changed space within the virtual environment. Accordingly, the electronic device and method according to various example embodiments of the present disclosure may provide the immersive user experience to the user by providing an avatar having a proportion optimized for the space.

Figure 5:
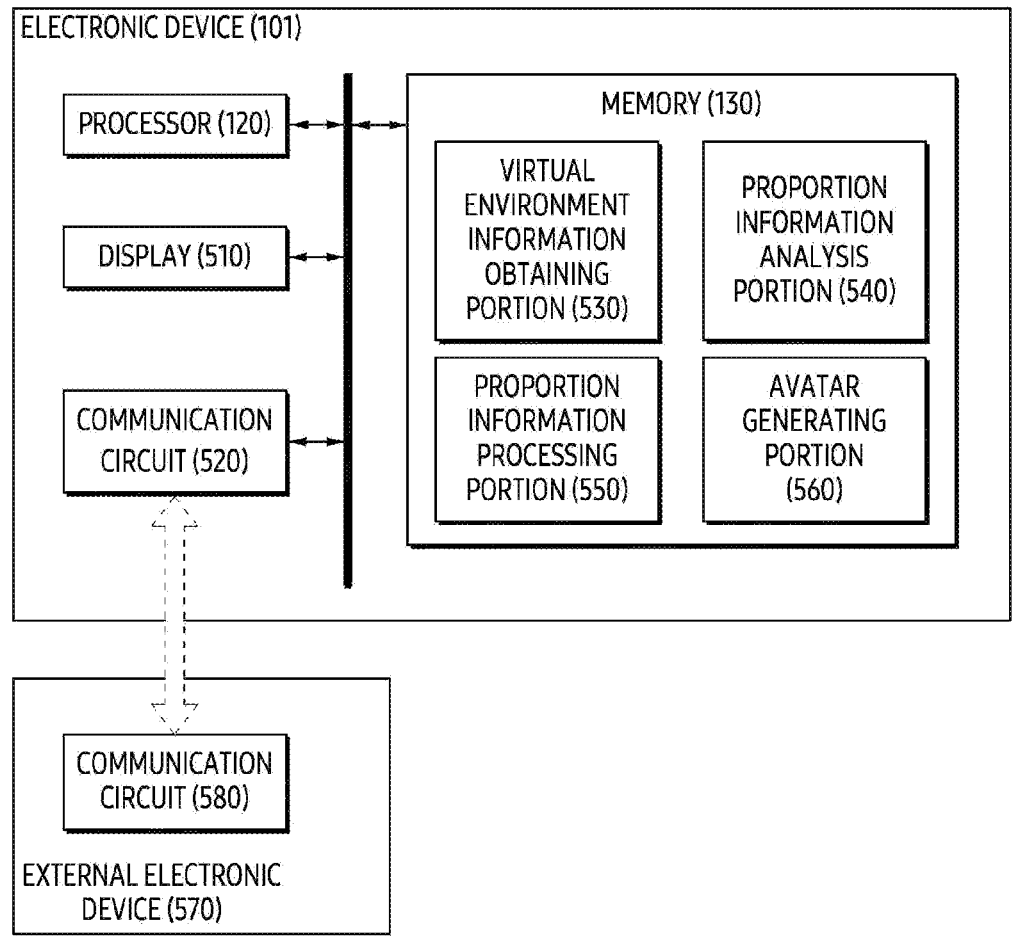
FIG. 5 is a block diagram illustrating an example configuration of an electronic device according to various embodiments.

FIG. 5 is a block diagram illustrating an example configuration of an electronic device according to various embodiments. An electronic device 101 of FIG. 5 may be an example of the electronic device 101 of FIG. 1 and a wearable device 101-1 of FIGS. 2A, 2B, 3A and 3B.

Referring to FIG. 5, an example situation in which the electronic device 101 and an external electronic device 570 are connected to each other based on a wired network and/or a wireless network is illustrated. For example, the wired network may include a network such as the Internet, a local area network (LAN), a wide area network (WAN), or a combination thereof. For example, the wireless network may include a network such as long term evolution (LTE), 5*g* new radio (NR), wireless fidelity (WiFi), Zigbee, near field communication (NFC), Bluetooth, Bluetooth low-energy (BLE), or a combination thereof. Although the electronic device 101 and the external electronic device 570 are illustrated as being directly connected, the electronic device 101 and the external electronic device 570 may be indirectly connected through one or more routers and/or access points (APs). In other words, the electronic device 101 is illustrated as being directly connected to a communication circuit 580 of the external electronic device 570 through a communication circuit 520, but the embodiment of the present disclosure is not limited thereto.

Referring to FIG. 5, according to an embodiment, the electronic device 101 may include at least one of a processor (e.g., including processing circuitry) 120, a memory 130, a display 510, and/or a communication circuit 520. The processor 120, the memory 130, the display 510, and the communication circuit 520 may be electronically and/or operably coupled with each other by, for example, a communication bus. Hereinafter, that hardware components are operably coupled with each other may refer, for example, to direct or indirect connections between the hardware components being established wired or wirelessly so that a second hardware component is controlled by a first hardware component among the hardware components. Although illustrated based on different blocks, the embodiment is not limited thereto, and some of the hardware components illustrated in FIG. 5 (e.g., at least some of the processor 120, the memory 130, and the communication circuit 520) may be included in a single integrated circuit such as a system on a chip (SoC). A type and/or the number of hardware components included in the electronic device 101 is not limited as illustrated in FIG. 5. For example, the electronic device 101 may include only some of the hardware components illustrated in FIG. 5.

According to an embodiment, the processor 120 of the electronic device 101 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may include a hardware component for processing data based on one or more instructions. The hardware component for processing the data may include, for example, an arithmetic and logic unit (ALU), a floating point unit (FPU), and a field programmable gate array (FPGA). For example, the hardware component for processing the data may include a central processing unit (CPU), a graphics processing unit (GPU), a digital signal processing (DSP), and/or a neural processing unit (NPU). The number of the processors 120 may be one or more. For example, the processor 120 may have a structure of a multi-core processor, such as a dual core, a quad core, or a hexa core. The processor 120 of FIG. 5 may include at least a portion of the processor 120 of FIG. 1.

According to an embodiment, the memory 130 of the electronic device 101 may include a hardware component for storing data and/or instructions input to the processor 120 and/or output from the processor 120. The memory 130 may include, for example, volatile memory such as random-access memory (RAM), and/or non-volatile memory such as read-only memory (ROM). The volatile memory may include at least one of, for example, dynamic RAM (DRAM), static RAM (SRAM), Cache RAM, and pseudo SRAM (PSRAM). The non-volatile memory may include at least one of, for example, a programmable ROM (PROM), an erasable PROM (EPROM), an electrically erasable PROM (EEPROM), a flash memory, a hard disk, a compact disk, and an embedded multimedia card (eMMC). The memory 130 of FIG. 5 may include at least a portion of the memory 130 of FIG. 1.

According to an embodiment, the display 510 of the electronic device 101 may output visualized information (e.g., a screen of FIGS. 4, 10C, and 12) to a user. The number of the displays 510 included in the electronic device 101 may be one or more. For example, the display 510 may output the visualized information to the user, by being controlled by the processor 120 and/or a graphic processing unit (GPU) (not illustrated). The display 510 may include a flat panel display (FPD), and/or electronic paper. The FPD may include a liquid crystal display (LCD), a plasma display panel (PDP), a digital mirror device (DMD), one or more light emitting diodes (LEDs), and/or a micro LED. The LED may include an organic LED (OLED). The display 510 of FIG. 5 may include at least a portion of a display module 160 of FIG. 1.

In an embodiment, penetration of light may occur in at least a portion of the display 510. The electronic device 101 may provide a user experience related to augmented reality by providing the user with a combination of light output through the display 510 and light penetrating the display 510. As described above with reference to FIGS. 2A and 2B and/or FIGS. 3A and 3B, according to an embodiment, the display 510 of the electronic device 101 may have a structure for covering the entire field-of-view (FoV) of the user, or emitting light toward the FoV, within the state of being worn on a user's body part, such as a head. Although not illustrated, the electronic device 101 may include another output means for outputting information in a form other than a visual form and an audible form. For example, the electronic device 101 may include at least one speaker for outputting an audio signal, and/or a motor (or actuator) for providing haptic feedback based on vibration.

According to an embodiment, the communication circuit 520 of the electronic device 101 may include hardware for supporting transmission and/or reception of an electrical signal between the electronic device 101 and the external electronic device 570. The communication circuit 520 may include at least one of, for example, a modem (MODEM), an antenna, and an optic/electronic (O/E) converter. The communication circuit 520 may support the transmission and/or reception of the electrical signal based on various types of communication means such as Ethernet, Bluetooth, Bluetooth low energy (BLE), ZigBee, long term evolution (LTE), and 5G new radio (NR). The communication circuit 520 of FIG. 5 may include at least a portion of a communication module 190 of FIG. 1 and/or an antenna module 197.

Although not illustrated, according to an embodiment, the electronic device 101 may include an output means for outputting information in a form other than a visualized form. For example, the electronic device 101 may include a speaker for outputting an acoustic signal. For example, the electronic device 101 may include the motor for providing the haptic feedback based on the vibration.

Referring to FIG. 5, according to an embodiment, within the memory 130 of the electronic device 101, one or more instructions (or commands) indicating a calculation and/or an operation to be performed by the processor 120 of the electronic device 101 on data may be stored. A set of one or more instructions may be referred to as a program, firmware, operating system, process, routine, sub-routine, and/or application. Hereinafter, that the application is installed in the electronic device (e.g., the electronic device 101) may refer, for example, to one or more instructions provided in a form of the application are stored in the memory 130, and the one or more applications are stored in a format that is executable by the processor of the electronic device (e.g., a file having an extension designated by the operating system of the electronic device 101). According to an embodiment, the electronic device 101 may perform the operations of FIGS. 6, 7, 8, 9, 10A, 11A, and 14, by executing the one or more instructions stored in the memory 130.

Referring to FIG. 5, the one or more instructions included in the memory 130 may be divided into a virtual environment information obtaining portion 530, a proportion information analysis portion 540, a proportion information processing portion 550, and/or an avatar generating portion 560. For example, each of the virtual environment information obtaining portion 530, the proportion information analysis portion 540, the proportion information processing portion 550, and the avatar generating portion 560 may be implemented as a program or software.

For example, the electronic device 101 may obtain information related to the space using the virtual environment information obtaining portion 530. For example, the electronic device 101 may obtain at least one of information on a space within a virtual environment, information on a situation related to the space, information on avatars located within the space, or information on a virtual object located within the space from the external electronic device 570 that provides the virtual environment, using the virtual environment information obtaining portion 530. For example, the external electronic device 570 may include a server that provides the virtual environment.

For example, the information on the space may include at least one of a name of the space provided by the virtual environment, a purpose of the space, a role of an avatar corresponding to the user within the space, and a style of the space. For example, the purpose of the space may include meetings, lectures, listening to music, drinking, and freedom. For example, the role of the avatar may include a host, a participant, and a third party. For example, the style of the space may include reality and cartoon.

For example, the information on the situation may include contents in progress within the space. For example, the content may include context progressing within the space, such as business meetings, play, listening to music, and games.

For example, the information on the avatars may include body proportions for the avatars of other users located within the space. For example, the body proportions for the avatars of the other users may be identified based on a blend shape for generating the avatar or a blend weight for adjusting the blend shape. The body proportions for the avatars of the other users may be identified for each avatar. For example, the information on the avatars may be defined as a percentage for the avatars. For example, an avatar having the first proportion may account for 76% of the avatars. An avatar having the second proportion may account for 10% of the avatars. An avatar having the third proportion may account for 4% of the avatars. An avatar having a body proportion defined by the user that is different from the first proportion, the second proportion, and the third proportion may occupy the remaining 10%. The body proportion defined by the user may be identified as one of the first proportion, the second proportion, or the third proportion in which a value indicating the body proportion is most similar.

For example, information on the virtual object may include a name for objects included within the space, a shape or structure of the objects, or an age of use of the objects. For example, the name for the objects may include alcohol and cars. For example, the age of use of the objects may include those for adults, infants, teenagers, or the elderly. For example, the virtual object may indicate an object capable of interacting with the avatar.

For example, the electronic device 101 may obtain user input information input from the user of the electronic device 101 by using the virtual environment information obtaining portion 530. For example, the user input information may include information on the avatar corresponding to the user or information on the user. For example, the information on the avatar corresponding to the user may include information on an appearance of the avatar. For example, the information on the appearance of the avatar may include at least one of the avatar's appearance, age, gender, height, body mass index (BMI), a record of a proportion of the avatar used by the user, or a proportion of the avatar preferred by the user. For example, the information on the user may include information on the user's appearance. For example, the information on the user's appearance may include at least one of the user's appearance, age, gender, height, BMI, or the user's body proportion.

Specific content related to obtaining the user input information and the information related to the space will be described in greater detail below with reference to FIG. 7.

For example, the electronic device 101 may analyze obtained information using the proportion information analysis portion 540. In other words, the electronic device 101 may generate (or obtain) analyzed data based on the information obtained using the proportion information analysis portion 540. For example, the electronic device 101 may obtain information in which proportion information is mapped (hereinafter referred to as mapping information) from the external electronic device 570 that provides the virtual environment. For example, the external electronic device 570 may include the server that provides the virtual environment. For example, the mapping information may include proportion information mapped with respect to a type of the space, the purpose of the space, the role of the avatar within the space, the situation related to the space, the virtual object, and information on the avatar corresponding to the user. For example, in case that the space is a meeting room, the mapping information may indicate the third proportion (or a default proportion). For example, in case that the space is a bar, the mapping information may indicate the first proportion (or an adult proportion). For example, in case that the space is a playground, the mapping information may indicate the second proportion (or a child proportion). For example, in case that the purpose of the space is the meeting or the drinking, the mapping information may indicate the first proportion. For example, in case that the purpose of the space is the play, the mapping information may indicate the second proportion. For example, in case that the role of the avatar is the host, the mapping information may indicate the first proportion. For example, in case that the role of the avatar is the participant, the mapping information may indicate the third proportion. For example, in case that the situation is the meeting or the drinking, the mapping information may indicate the first proportion. For example, in case that the virtual object is the alcohol or tobacco, the mapping information may indicate the first proportion. For example, in case that the virtual object is an amusement ride, the mapping information may indicate the second proportion. For example, in case that the virtual object is an item such as clothes for makeup, the mapping information may indicate a designated body proportion for the item or a proportion indicating the designated body proportion. For example, in case that the information on the avatar is an adult indicating the user's age, the mapping information may indicate the first proportion. For example, in case that the information on the avatar indicates that an appearance of the user's preferred avatar is the child, the mapping information may indicate the second proportion. For example, in case that the information on the user indicates that the user has been drinking, the mapping information may indicate the first proportion. However, the present disclosure is not limited thereto, and the proportion indicated by the mapping information may be set by the user of the electronic device 101 or the external electronic device 570. For example, in case that the virtual object is the amusement ride, the mapping information may be changed to indicate the first proportion rather than the second proportion. More specific details related to this are described in greater detail with reference to FIG. 8.

For example, the electronic device 101 may generate analysis data based on the obtained information and the mapping information using the proportion information analysis portion 540. The analysis data may include the space, the situation, the virtual object, avatars of the user and other users, and proportion information for each of the user input information. The proportion information may indicate or define a proportion of the avatar corresponding to factors such as the space or the situation. For example, the proportion information may indicate one of the first proportion, the second proportion, and the third proportion. For example, the electronic device 101 may generate the analysis data based on information obtained during a designated time period using the proportion information analysis portion 540. For example, the electronic device 101 may identify an event for identifying candidate proportions, by comparing the analysis data based on information obtained during the designated time interval (hereinafter referred to as current analysis data) with the data analyzed for a time interval prior to the designated time interval (hereinafter referred to as past analysis data), using the proportion information analysis portion 540. For example, the event for identifying the candidate proportions may include a change in the space or a change in the situation. For example, the electronic device 101 may identify that the event has occurred by identifying that the current analysis data is changed by comparing it with the past analysis data. For example, in response to identifying the event, the electronic device 101 may identify a priority for each of the proportions for the avatar corresponding to the user of the electronic device 101 based on the current analysis data. For example, in case that the proportions include the first proportion, the second proportion, and the third proportion, the electronic device 101 may identify a priority of the first proportion, a priority of the second proportion, and a priority of the third proportion. More specific details related to this are described in greater detail below with reference to FIG. 9.

For example, the electronic device 101 may identify the candidate proportion based on the analysis data using the proportion information processing portion 550. For example, the electronic device 101 may identify candidate proportions having the priority being higher than or equal to a reference priority from among the proportions for the avatar. For example, the candidate proportions may indicate body proportions for which a preview is to be provided to the user. For example, the electronic device 101 may display visual objects having a body proportion determined according to the candidate proportions through the display 510. For example, the electronic device 101 may identify one proportion identified among the candidate proportions, using the proportion information processing portion 550. More specific details related to this are described in greater detail below with reference to FIGS. 10A, 10B and 10C.

For example, the electronic device 101 may generate the avatar corresponding to the user based on the identified proportion, using the avatar generating portion 560. For example, the electronic device 101 may identify information on a current proportion of the avatar. The electronic device 101 may identify a weight to correct a difference between the information on the current proportion and information on a changed proportion. For example, the information on the current proportion may include a first mesh coordinate, and the information on the changed proportion may include a second mesh coordinate. For example, the weight may include a blend weight identified based on the first mesh coordinate and the second mesh coordinate. For example, the electronic device 101 may generate an item to be worn by the avatar having the identified proportion, using the avatar generating portion 560. For example, the item may include clothes to be worn by the avatar having the identified proportion. More specific details related to this are described in greater detail below with reference to FIGS. 11A, 11B and 11C.

For example, the electronic device 101 may display the avatar and the item generated using the virtual environment information obtaining portion 530, the proportion information analysis portion 540, the proportion information processing portion 550, and the avatar generating portion 560, through the display 510.

In FIG. 5, a method in which the electronic device 101 generates the avatar having the body proportion adjusted according to the space of the virtual environment and the item to be worn by the avatar using the virtual environment information obtaining portion 530, the proportion information analysis portion 540, the proportion information processing portion 550, and the avatar generating portion 560 is described, but the present disclosure is not limited thereto. For example, the electronic device 101 may adjust a proportion of a portion of the avatar using the virtual environment information obtaining portion 530, the proportion information analysis portion 540, the proportion information processing portion 550, and the avatar generating portion 560. For example, the portion of the avatar may include a face. More specific details related to this are described in greater detail below with reference to FIG. 13.

Figure 6:
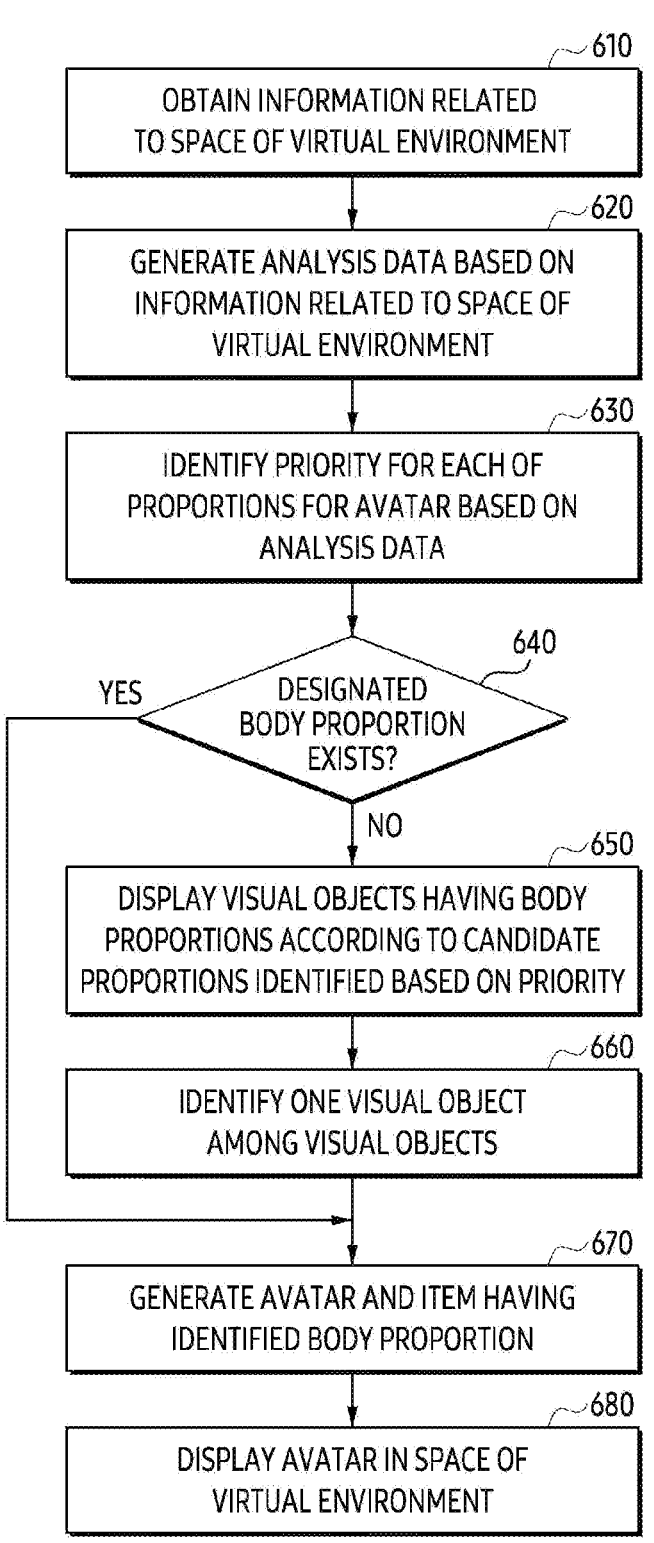
FIG. 6 is a flowchart illustrating an example method of displaying an avatar having an adjusted proportion based on a space of a virtual environment according to various embodiments.

FIG. 6 is a flowchart illustrating an example method of displaying an avatar having an adjusted proportion based on a space of a virtual environment according to various embodiments.

At least some of the method of FIG. 6 may be performed by an electronic device 101 of FIG. 5. For example, the at least some of the method may be controlled by a processor 120 of the electronic device 101.

Referring to FIG. 6, in operation 610, the processor 120 may obtain information related to the space of the virtual environment. For example, the space may include a three-dimensional area defined within the virtual environment. For example, the space may be set by an external electronic device (e.g., a server) that provides the virtual environment. For example, each of a plurality of spaces within the virtual environment may be distinguished by being set by the external electronic device. For example, the space may indicate a space in which an avatar corresponding to a user of the electronic device 101 is located in the virtual environment. For example, the information related to the space may include at least some of information on the space within the virtual environment, information on a situation related to the space, information on avatars located within the space, or information on a virtual object located within the space.

For example, the information related to the space may be obtained based on an event for obtaining the information related to the space. For example, the event may include a case in which a time at which the avatar corresponding to the user of the electronic device 101 is located in the space is greater than or equal to a length of a designated time interval. For example, the length may be referred to as a period (or obtaining period) of the designated time interval. More specific details related to this are described in greater detail below with reference to FIG. 7.

Although not illustrated in FIG. 6, the processor 120 may obtain user input information input from the user. For example, the user input information may include information on the avatar corresponding to the user or information on the user. For example, the user input information may be obtained before obtaining the information related to the space. For example, the user input information may be input by the user when an application providing the virtual environment is executed. The user input information may be obtained in response to the input.

In operation 620, the processor 120 may generate analysis data based on the information related to the space of the virtual environment. The analysis data may indicate current analysis data generated based on information related to the space obtained for the designated time interval including a current timing. In FIG. 6, it is illustrated that the analysis data is generated based on information related to the virtual space, but the present disclosure is not limited thereto. For example, the analysis data may be generated based on the user input information.

For example, the processor 120 may obtain information (or mapping information) to which proportion information is mapped. For example, the mapping information may be obtained from an external electronic device 570 that provides the virtual environment. For example, the mapping information may include proportion information mapped with respect to a type of the space, a purpose of the space, a role of the avatar within the space, the situation related to the space, the virtual object, and information on the avatar corresponding to the user.

For example, the processor 120 may generate the analysis data based on the information related to the space, the user input information, and the mapping information. For example, the analysis data may include the proportion information to which the information related to the space is mapped. For example, the analysis data may include proportion information for the space, proportion information for the situation, proportion information for the virtual object, or proportion information for the avatar corresponding to the user. The proportion information for the space may be referred to as proportion information defined in the space. The proportion information for the situation may be referred to as proportion information defined in the situation. The proportion information for the virtual object may be referred to as proportion information for using the virtual object.

For example, the analysis data may include proportion information on avatars for other users within the space. The proportion information on the avatars may be referred to as proportion information used by the avatars. For example, the processor 120 may identify a value of the most frequently used body proportion among the body proportions for each of the avatars. For example, the processor 120 may identify a proportion corresponding to the value. For example, the analysis data may include the proportion corresponding to the value as the proportion information on the avatars. As described above, the proportion information on the avatars included in the analysis data may be identified through additional data processing rather than being identified based on values mapped within the analysis information. More specific details related to this are described in greater detail below with reference to FIG. 8.

In operation 630, the processor 120 may identify a priority for each of the proportions for the avatar based on the analysis data. For example, the proportions may include a proportion indicated by the proportion information included in the analysis data. For example, in case that the proportion information for the space in the analysis data is a first proportion, the proportion information for the situation is a second proportion, the proportion information for the avatars is the first proportion, the proportion information for the virtual object is a third proportion, the user's preferred proportion information is the first proportion, and the proportion information for the user's age is the second proportion, the proportions may include the first proportion, the second proportion, and the third proportion.

For example, the processor 120 may identify a count for each of the proportions. In the above example, the processor 120 may identify the number of the first proportion as 3, the number of the second proportion as 2, and the number of the third proportion as 1. The processor 120 may identify a priority value for the first proportion as 1, a priority value for the second proportion as 2, and a priority value for the third proportion as 3. For example, a lower priority value may indicate a higher priority. Accordingly, the processor 120 may identify the priority for each of the proportions based on the number for each of the proportions.

However, the present disclosure are not limited thereto. For example, the processor 120 may identify the priority using an artificial intelligence model (AI model). For example, the processor 120 may input the analysis data into the artificial intelligence model (AI model). In other words, the analysis data may be an input of the artificial intelligence model (AI model). Accordingly, the processor 120 may obtain the priority, which is an output of the artificial intelligence model (AI model). Referring to the above description, the processor 120 may identify the priority using a statistical technique or a deep learning technique using the artificial intelligence model (AI model). For example, the statistical technique may include a decision tree. For example, in the above-described example, it may be difficult for the processor 120 to identify the priority value of each of the proportions based on the number for each of the proportions. For example, in case that the number of the first proportion and the number of the second proportion are the same, since the priority between the first proportion and the second proportion is not distinguished, it may be difficult for the processor 120 to identify the priority value. Based on the statistical technique, in case of identifying a record in which the user selects the first proportion more than the second proportion, the processor 120 may identify the first proportion as a higher priority (e.g., a lower priority value) than the second proportion. For example, using the artificial intelligence model (AI model), the processor 120 may identify a body proportion of an avatar to be used in the future through the current analysis data.

In operation 640, the processor 120 may identify whether a designated body proportion exists. For example, the designated body proportion may include a fixed body proportion defined by the space, the situation, or the virtual object. For example, in case that the avatar corresponding to the user wears the virtual object, which is a clothing requiring the designated body proportion, the designated body proportion may be enforced.

In operation 640, in case that it is identified that the designated body proportion exists, the processor 120 may perform operation 670. On the other hand, in operation 640, in case that it is identified that the designated body proportion does not exist, the processor 120 may perform operation 650.

In operation 650, the processor 120 may display visual objects having body proportions according to candidate proportions identified based on the priority. For example, the processor 120 may identify the candidate proportions whose priority for the proportions greater than or equal to a reference priority. In the above example for the proportions comprising the three priority values, in case that a value of the reference priority is 2, the candidate proportions may include the first proportion and the second proportion. The processor 120 may display a first visual object indicating the avatar having a body proportion according to the first proportion and a second visual object indicating the avatar having a body proportion according to the second proportion. For example, the processor 120 may display the first visual object and the second visual object through a display 510. In FIG. 6, it is assumed as an example of identifying two candidate proportions among the three proportions, but the present disclosure is not limited thereto. For example, the candidate proportion may include three or more proportions, or may include one proportion. In case that the candidate proportion includes the one proportion, the following operation 660 may be omitted. In other words, in case that the candidate proportion includes the one proportion, the one proportion may be identified.

In operation 660, the processor 120 may identify one visual object among the visual objects. For example, the processor 120 may identify the visual object based on an input for the one visual object among the visual objects displayed through the display 510. For example, the processor 120 may obtain the input. For example, the input may include the user's touch input for the electronic device 101. The user's touch input for the electronic device 101 may include a touch for at least a portion of the display 510 and a gesture for an area on real space indicating the visual object.

In operation 670, the processor 120 may generate an avatar and an item having a identified body proportion. For example, the identified body proportion may include a body proportion of the visual object identified through operation 660. For example, the identified body proportion may include the designated body proportion described in operation 640.

For example, the processor 120 may generate an avatar having the identified body proportion. For example, the processor 120 may identify a body proportion of the avatar corresponding to the current user. For convenience of explanation, hereinafter, it is assumed that the current body proportion of the avatar is the first proportion, and the identified body proportion is the second proportion. The processor 120 may identify the first proportion and the second proportion.

For example, the processor 120 may identify whether an avatar having the second proportion is stored. For example, the processor 120 may identify whether the avatar having the second proportion is stored in a memory 130 or the external electronic device 570. For example, as the processor 120 identifies that the avatar having the second proportion is stored, the processor 120 may obtain the avatar having the second proportion. As the processor 120 identifies that the avatar having the second proportion is not stored, the processor 120 may identify a weight for adjusting from the first proportion to the second proportion. For example, the weight may include a blend weight. For example, the processor 120 may obtain an avatar having the second proportion changed from the first proportion based on the weight.

For example, the processor 120 may generate an item for the identified body proportion (e.g., the second proportion). For example, the processor 120 may identify whether the item for the second proportion is stored in the memory 130 or the external electronic device 570. For example, as the processor 120 identifies that the item for the second proportion is stored, the processor 120 may obtain an item having the second proportion. As the processor 120 identifies that the item having the second proportion is not stored, the processor 120 may identify the weight for adjusting from the first proportion to the second proportion. For example, the weight may include the blend weight. For example, the processor 120 may obtain an item having the second proportion changed from the first proportion based on the weight. Detail contents for a method of generating the avatar and item are described in greater detail below with reference to FIGS. 11A, 11B and 11C.

In operation 680, the processor 120 may display the avatar in the space of the virtual environment. For example, the processor 120 may display the avatar through the display 510. For example, the avatar may indicate an avatar having the changed second proportion. The avatar may be in a state in which the item for the second proportion is worn.

Referring to the above description, in FIG. 6, a case in which the body proportion of the avatar corresponding to the user is changed is assumed and described as an example, but the present disclosure is not limited thereto. For example, in case that the one visual object identified by the processor 120 in operation 660 is the same as the body proportion currently used by the avatar, the processor 120 may omit operation 670 and may perform operation 680.

Figure 7:
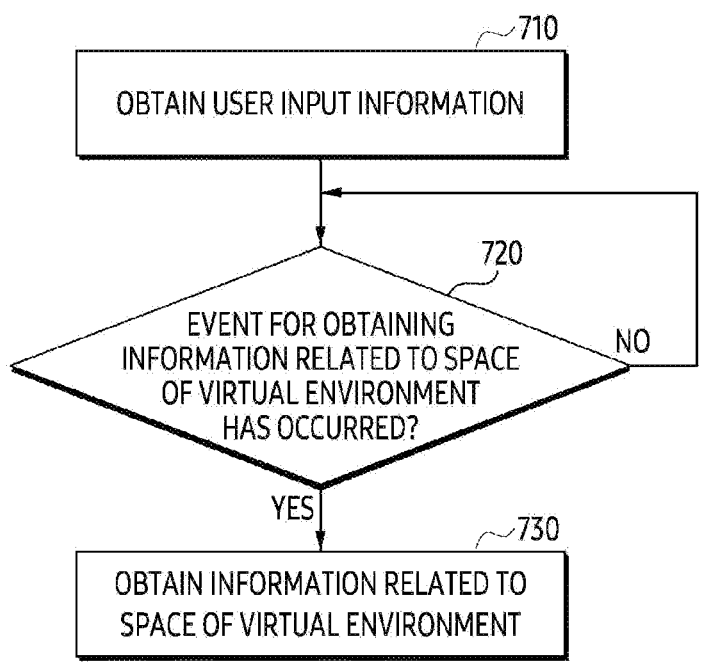
FIG. 7 is a flowchart illustrating an example method of obtaining user input information and information related to a space, according to various embodiments.

FIG. 7 is a flowchart illustrating an example method of obtaining user input information and information related to a space, according to various embodiments.

At least some of the method of FIG. 7 may be performed by an electronic device 101 of FIG. 5. For example, the at least some of the method may be controlled by a processor 120 of the electronic device 101. The method of FIG. 7 may include example operations for operation 610 of FIG. 6.

Referring to FIG. 7, in operation 710, the processor 120 may obtain user input information. For example, the user input information may include information on the avatar corresponding to the user or information on the user. For example, the user input information may be obtained before obtaining the information related to the space. For example, the user input information may be input by the user when an application providing the virtual environment is executed. The user input information may be obtained in response to the input.

For example, the information on the avatar corresponding to the user may include information on an appearance of the avatar. For example, the information on the appearance of the avatar may include at least one of the avatar's appearance, age, gender, height, body mass index (BMI), a record of a proportion of the avatar used by the user, or a proportion of the avatar preferred by the user. For example, the information on the user may include information on the user's appearance. For example, the information on the user's appearance may include at least one of the user's appearance, age, gender, height, BMI, or the user's body proportion. For example, the user's body proportion may be identified based on a wearing state for a wearable device 101-1. For example, the processor 120 may identify a location of the user's hand and a location of the wearable device 101-1. The processor 120 may predict the user's height based on the location of the hand and the location of the wearable device 101-1. The processor 120 may identify the user's body proportion based on the predicted height and a length of the user's face. In addition, the user's body proportion may be determined based on body proportions of another user who is different from the user. For example, the processor 120 may use the other user's body proportion obtained from an external electronic device 580 as the user's body proportion.

In operation 720, the processor 120 may identify whether an event for obtaining information related to a space of the virtual environment has occurred. For example, the event may include a case that an avatar corresponding to a user of the electronic device 101 is located in the space, a case that the number of other avatars within a designated range from the location of the avatar is greater than or equal to the threshold number of avatars, or a case that a period (or obtaining period) corresponding to a length of a designated time interval has expired.

For example, in case that the avatar corresponding to the user moves within the virtual environment and enters the space from another space, the processor 120 may identify the event. Accordingly, in operation 730, the processor 120 may obtain the information related to the space. Entering the space may include being located in the space.

For example, in case that other avatars are located within the designated range from the location of the avatar corresponding to the user, the processor 120 may identify the event. For example, the processor 120 may identify the event in response to identifying that the other avatars are located more than the threshold number of avatars within the designated range from the location of the avatar. Accordingly, in operation 730, the processor 120 may obtain the information related to the space. The designated range may indicate an area of the virtual environment shown through a display 510 based on the current location of the avatar. For example, the threshold number of avatars may be set by the user of an external electronic device 570 or the electronic device 101 (or the processor 120) that provides the virtual environment.

For example, in case that the avatar corresponding to the user is located within the space for the length of the designated time interval, the processor 120 may identify the event. Accordingly, in operation 730, the processor 120 may obtain the information related to the space. The length may indicate a period of the designated time interval. When the avatar is located within the space for a time corresponding to the length, the information related to the space is obtained, and the period may be referred to as the obtaining period. For example, the space may include a three-dimensional area defined within the virtual environment. For example, the space may be defined or set by an external electronic device (e.g., a server) for providing the virtual environment. In operation 720, in case that the processor 120 fails to identify the event (or in case that the event does not occur), the processor 120 may perform operation 720 again. For example, the processor 120 may identify whether the event has occurred.

For example, the information related to the space may include at least one of information on the space within the virtual environment, information on a situation related to the space, information on avatars located within the space, or information on a virtual object located within the space.

For example, the information on the space may include at least one of a name of the space provided by the virtual environment, a purpose of the space, a role of an avatar corresponding to the user within the space, and a style of the space. For example, the purpose of the space may include meetings, lectures, listening to music, drinking, and freedom. For example, the role of the avatar may include a host, a participant, and a third party. For example, the style of the space may include reality and cartoon.

For example, the information on the situation may include contents in progress within the space. For example, the contents may include context progressing within the space, such as business meetings, play, listening to music, and games. However, the present disclosure is not limited thereto. For example, the information on the situation may be defined as content that indicates a motion or action performed by the avatar corresponding to the user of the electronic device 101 regardless of the space. In other words, the information on the situation may be set regardless of the space.

For example, the information on the avatars may include body proportions for the electronic device 101 located within the space and the avatars of other users. For example, the body proportions for the avatars of the other users may be identified based on a blend shape for generating the avatar or a blend weight for adjusting the blend shape. The body proportions for the avatars of the other users may be identified for each avatar. For example, the information on the avatars may be defined as a percentage for the avatars. For example, an avatar having the first proportion may account for 76% of the avatars. An avatar having the second proportion may account for 10% of the avatars. An avatar having the third proportion may account for 4% of the avatars. An avatar having a body proportion defined by the user that is different from the first proportion, the second proportion, and the third proportion may occupy the remaining 10%. The body proportion defined by the user may be identified as one of the first proportion, the second proportion, or the third proportion in which a value indicating the body proportion is most similar.

For example, information on the virtual object may include a name for objects included within the space, a shape or structure of the objects, or an age of use of the objects. For example, the name for the objects may include alcohol and cars. For example, the age of use of the objects may include those for adults, infants, teenagers, or the elderly. For example, the virtual object may indicate an object capable of interacting with the avatar.

In the above example, it is illustrated that the processor 120 obtains the information related to the space in response to identifying the event, but the present disclosure is not limited thereto. For example, the processor 120 may obtain at least some of the information related to the space based on the event. For example, in case that an event indicating entering the space is identified, the processor 120 may obtain the information on the space or the information on the virtual object located within the space. For example, in case that an event indicating that it is located within the space as long as the obtaining period is identified, the processor 120 may obtain information on the body proportion of avatars of other users within the space and the information on the situation.

Figure 8:
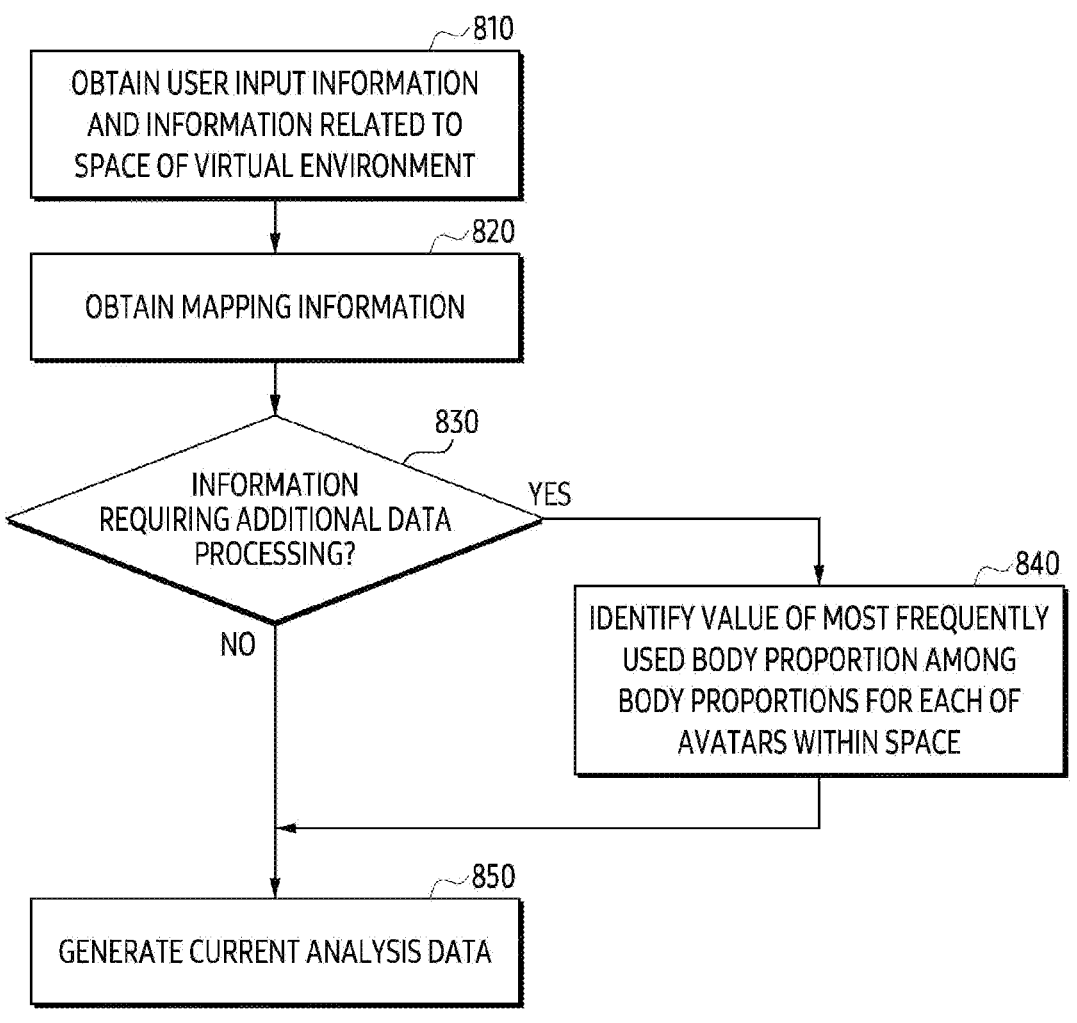
FIG. 8 is a flowchart illustrating an example method of generating data analyzed with respect to a body proportion for an avatar according to various embodiments.

FIG. 8 is a flowchart illustrating an example method of generating data analyzed with respect to a body proportion for an avatar according to various embodiments.

At least some of the method of FIG. 8 may be performed by an electronic device 101 of FIG. 5. For example, the at least some of the method may be controlled by a processor 120 of the electronic device 101. The method of FIG. 8 may include example operations for operation 620 of FIG. 6.

In operation 810, the processor 120 may obtain user input information and information related to a space of a virtual environment. For example, operation 810 may include operations 710 to 730 of FIG. 7. Hereinafter, details may not be repeated.

In operation 820, the processor 120 may obtain mapping information. The mapping information may include proportion information mapped with respect to information on a type of the space, a purpose of the space, a role of the avatar within the space, a situation related to the space, the virtual object, and an avatar corresponding to a user of the electronic device 101. For example, in case that the space is a meeting room, the mapping information may indicate a third proportion (or a default proportion). For example, in case that the space is a bar, the mapping information may indicate a first proportion (or an adult proportion). For example, in case that the purpose of the space is play, the mapping information may indicate a second proportion. For example, in case that the situation is a meeting or drinking, the mapping information may indicate the first proportion. However, the present disclosure is not limited thereto, and the proportion indicated by the mapping information may be set by the user of the electronic device 101 or an external electronic device 570. For example, in case that the purpose of the space is the play, the mapping information may be changed to indicate the first proportion rather than the second proportion.

In operation 830, the processor 120 may identify information requiring additional data processing. For example, the processor 120 may identify whether the additional data processing is required for the information related to the space. For example, the processor 120 may identify that the additional data processing is required, in case of proportion information on avatars of the user and other users.

In operation 830, the processor 120 may perform operation 840 on information identified as requiring the additional data processing. In operation 830, the processor 120 may perform operation 850 on information identified as not requiring the additional data processing.

In operation 840, the processor 120 may identify a value of the most frequently used body proportion among body proportions for each of the avatars within the space. For example, the processor 120 may identify the body proportions for each of the avatars. For example, the body proportions for each of the avatars may be identified based on a blend shape for generating the avatar or a blend weight for adjusting the blend shape. Based on the most frequently used body proportion value, the processor 120 may identify the proportion information for the avatars. For example, the proportion information for the avatars may include a proportion indicated by the value of the most frequently used body proportion. For example, the value of the most frequently used body proportion may have the first proportion, the second proportion, the third proportion, or a body proportion defined by the user. The body proportion defined by the user may be identified as one of the first proportion, the second proportion, or the third proportion in which a value indicating the body proportion is most similar.

In operation 850, the processor 120 may generate current analysis data. For example, the current analysis data may include information analyzed for information related to the space obtained during a designated time interval including the present. For example, the analysis data may be generated (or obtained) based on at least one of the user input information, the information related to the space, and the mapping information.

For example, the analysis data may include the space, the situation, the virtual object, avatars of the user and other users, and proportion information for each of the user input information. The proportion information may indicate or define a proportion of the avatar corresponding to factors such as the space or the situation. For example, the proportion information may indicate one of the first proportion, the second proportion, and the third proportion. For example, the analysis data may be configured in a form of a key-value database (key-value DB), as shown in the table below.

TABLE 1

```
{
  "starttime" : "Sat May 19 11:14:27 2018"
  "endtime : "Sat May 19 12:14:27 2018"
    "source_data" : {
        "space_type": "meetingroom",
        "space_purpose" : "business_meeting",
        "space_role" : "master",
        "situation" : "business_conversation",
        "other_users" :
        [
            { "id" : "minju2232", "ratio" : "real_adult" },
            { "id" : "hg2232", "ratio" : "real_adult" }
        ]
    },
    "ratio_data": {
        "space_type": "default",
        "space_purpose" : "real_adult",
        "space_role" : "default",
        "situation" : "real_adult",
        "other_users" : "real_adult"
    }
    ,
    "user":{
        "id" : "gildong.hong",
```

TABLE 1-continued

```
        "name" : "Gildong Hong",
        "prefer_ratio" : "kids ",
        "age" : "42"
    }
}
```

Referring to the above table, the analysis data may be stored in the key base database capable of relatively flexibly adjusting the schema. For example, the schema may include an element or a value for each element. For example, the analysis data may be newly stored in case of being changed compared to past analysis data. In case that the analysis data is newly stored, at least some of the past analysis data may be deleted. More specific details related to this are described in greater detail below with reference to FIG. 9.

The source_data may indicate an example of information related to obtained space. For example, the space_type may indicate the type of the space. For example, the space_purpose may indicate the purpose of the space. For example, the space_role may indicate the role of the avatar corresponding to the user within the space. For example, the situation may indicate a situation within the space. For example, the other_users may indicate information on the avatars of the user and other users. For example, the information on the avatars of the other users may include the user's identity (ID) and body proportion (e.g., the first proportion (the adult proportion)).

The ratio_data may indicate an example of proportion information corresponding to the elements. For example, the space_type may indicate the third proportion (the default proportion). For example, the space_purpose may indicate the first proportion (the adult proportion). For example, the space_role may indicate the third proportion (the default proportion). For example, the situation may indicate the first proportion (the adult proportion). For example, the other_users may indicate the first proportion (the adult proportion).

The user may indicate an example of the user input information. For example, the id may indicate the user's ID. For example, the name may indicate the user's name. For example, the prefer_ratio may indicate the user's preferred proportion. For example, the age may indicate the user's age.

Figure 9:
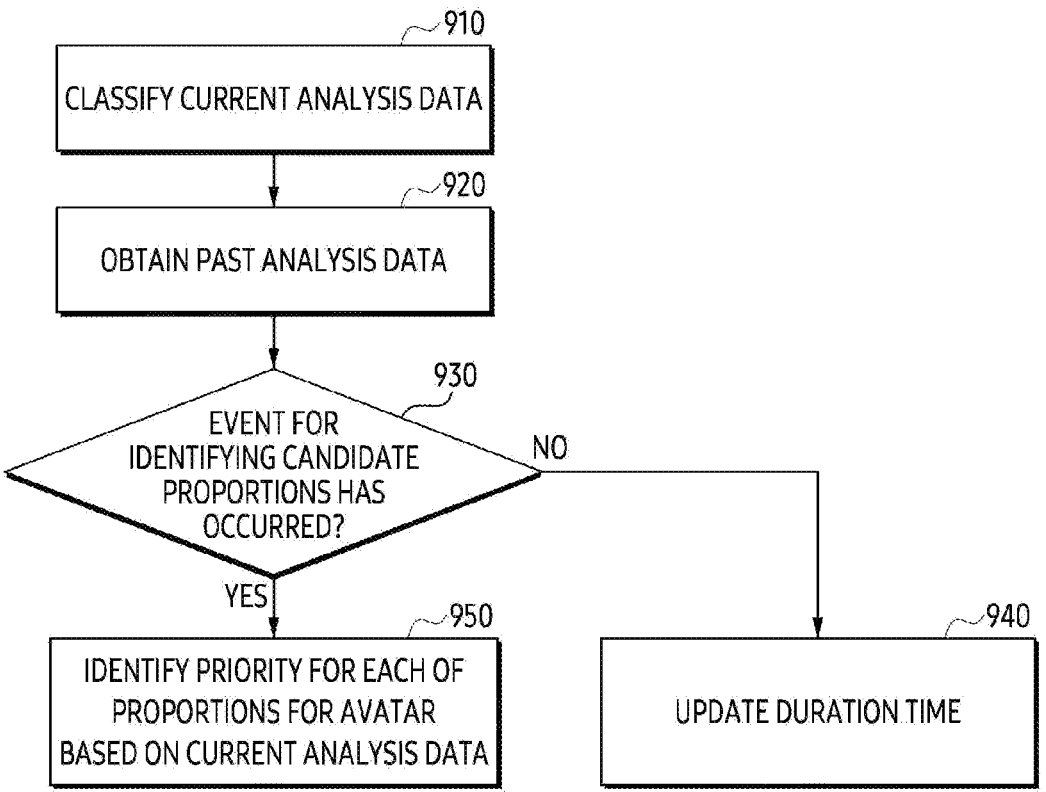
FIG. 9 is a flowchart illustrating an example method of identifying a priority for each of proportion for an avatar based on an event, according to various embodiments.

FIG. 9 is a flowchart illustrating an example method of identifying a priority for each of proportion for an avatar based on an event, according to various embodiments.

At least some of the method of FIG. 9 may be performed by an electronic device 101 of FIG. 5. For example, the at least some of the method may be controlled by a processor 120 of the electronic device 101. The method of FIG. 9 may include example operations for operation 630 of FIG. 6.

Referring to FIG. 9, in operation 910, the processor 120 may classify current analysis data. For example, the processor 120 may distinguish proportion information included in the current analysis data for each factor. For example, the processor 120 may distinguish the current analysis data as proportion information for the space, proportion information for the situation, proportion information for avatars of other users, proportion information for a virtual object, or proportion information for avatars corresponding to users of the electronic device 101.

In operation 920, the processor 120 may obtain past analysis data. For example, the processor 120 may obtain the past analysis data stored in a memory 130 or an external electronic device 570 that provides a virtual environment.

For example, the processor 120 may distinguish proportion information included in the past analysis data for each element.

In operation 930, the processor 120 may identify whether an event for identifying candidate proportions has occurred. For example, the processor 120 may compare the past analysis data with the current analysis data. For example, the processor 120 may identify whether the event has occurred based on the comparison between the current analysis data and the past analysis data.

For example, the event for identifying the candidate proportions may include a change in a space in which an avatar corresponding to a user of the electronic device 101 is located or a change in a situation. For example, the change in the space may include a case in which the avatar corresponding to the user enters a new space. For example, the change in the situation may include a case in which content that indicates a motion or action performed by the avatar is changed. For example, the change in the situation may include a case in which a lecture is terminated and changed to a break time in a situation of an avatar listening to the lecture. In addition, the event may include a case in which candidate proportions for the avatar include only one proportion. For example, the event may include a case in which a proportion indicated by all elements is the same. In addition, the event may include a case in which the avatar perform interaction with virtual objects within the space. The event may include, for example, a case in which the avatar boards a virtual object indicating a car, or a case in which the avatar starts smoking using a virtual object indicating a cigarette.

For example, in case that the processor 120 identifies the event for identifying the candidate proportions, the processor 120 may store the current analysis data in the memory 130 or the external electronic device 570. In other words, in case that the current analysis data has changed compared to the past analysis data, the processor 120 may store the current analysis data. In this case, the processor 120 may prevent and/or reduce unnecessary accumulation of the past analysis data and may delete at least some of the past analysis data in consideration of limitations in capacity of the memory 130 or the external electronic device 570.

In operation 930, in case that the processor 120 has identified the event for identifying the candidate proportions, it may perform operation 950. For example, in case that the processor 120 does not identify the event for identifying the candidate proportions, it may perform operation 940.

In operation 940, the processor 120 may update duration time. For example, the duration time may indicate a time for indicating the validity of the past analysis data. For example, updating the duration time may be understood as extending the duration time. In other words, the processor 120 may maintain the past analyzed data without storing the current analyzed data as it identifies that the current analyzed data has not changed compared to the past analyzed data. For example, the duration time may be defined based on a difference between the starttime and the endtime of the Table 1. For example, the duration time may be updated as the endtime is changed.

In operation 950, the processor 120 may identify a priority for each of the proportions for the avatar based on the current analysis data. For example, in operation 930, the processor 120 may identify the priority for each of the proportions in response to identifying the event.

For example, the processor 120 may identify the priority for each of the proportions for the avatar based on the current analysis data. For example, the proportions may include a proportion indicated by the proportion information included in the analysis data. For example, in case that the proportion information for the space in the analysis data is a first proportion, the proportion information for the situation is a second proportion, the proportion information for the avatars is the first proportion, the proportion information for the virtual object is a third proportion, the user's preferred proportion information is the first proportion, and the proportion information for the user's age is the second proportion, the proportions may include the first proportion, the second proportion, and the third proportion.

For example, the processor 120 may identify a count for each of the proportions. In the above example, the processor 120 may identify the number of the first proportion as 3, the number of the second proportion as 2, and the number of the third proportion as 1. The processor 120 may identify a priority value for the first proportion as 1, a priority value for the second proportion as 2, and a priority value for the third proportion as 3. For example, a lower priority value may indicate a higher priority. Accordingly, the processor 120 may identify the priority for each of the proportions based on the number for each of the proportions.

However, the present disclosure is not limited thereto. For example, the processor 120 may identify the priority using an artificial intelligence model (AI model). For example, the processor 120 may input the analysis data into the artificial intelligence model (AI model). In other words, the analysis data may be an input of the artificial intelligence model (AI model). Accordingly, the processor 120 may obtain the priority, which is an output of the artificial intelligence model (AI model). Referring to the above description, the processor 120 may identify the priority using a statistical technique or a deep learning technique using the artificial intelligence model (AI model). For example, the statistical technique may include a decision tree. For example, in the above-described example, it may be difficult for the processor 120 to identify the priority value of each of the proportions based on the number for each of the proportions. For example, in case that the number of the first proportion and the number of the second proportion are the same, since the priority between the first proportion and the second proportion is not distinguished, it may be difficult for the processor 120 to identify the priority value. Based on the statistical technique, in case of identifying a record in which the user selects the first proportion more than the second proportion, the processor 120 may identify the first proportion as a higher priority (e.g., a lower priority value) than the second proportion. For example, using the artificial intelligence model (AI model), the processor 120 may identify a body proportion of an avatar to be used in the future through the current analysis data.

Figure 10A:
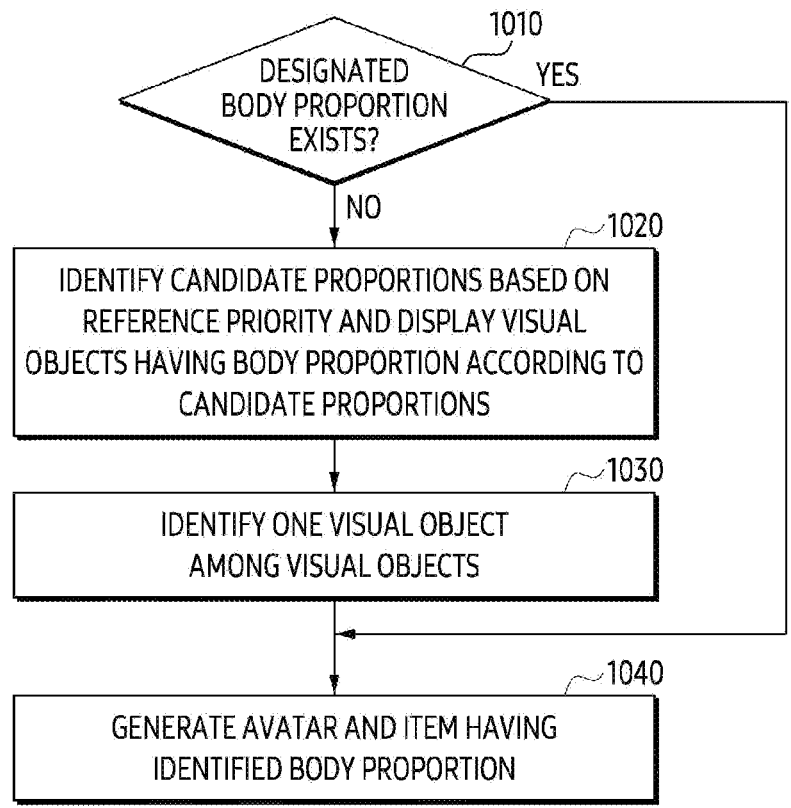
FIG. 10A is a flowchart illustrating an example method of generating an avatar based on candidate proportions identified based on a priority, according to various embodiments.
Figure 10B:
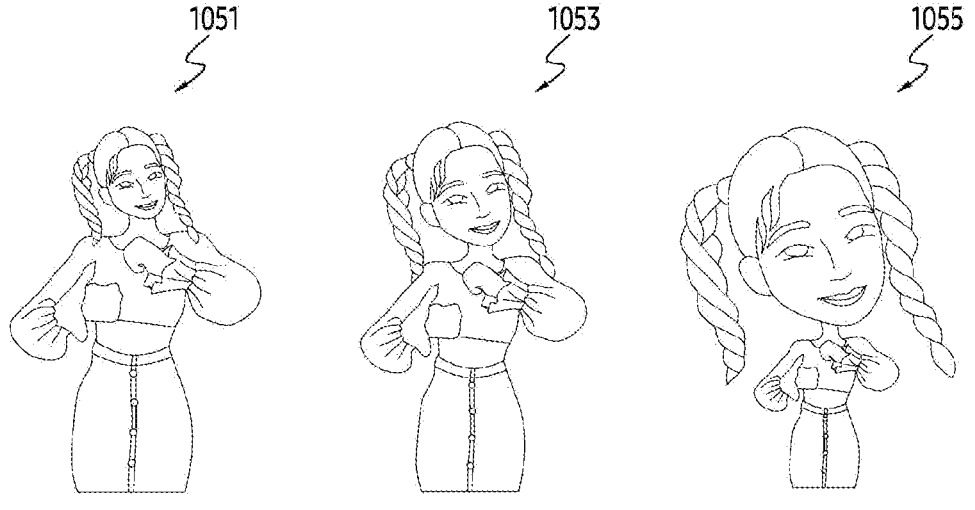
FIG. 10B is a diagram illustrating an example of visual objects having a body proportion determined according to candidate proportions according to various embodiments.
Figure 10C:
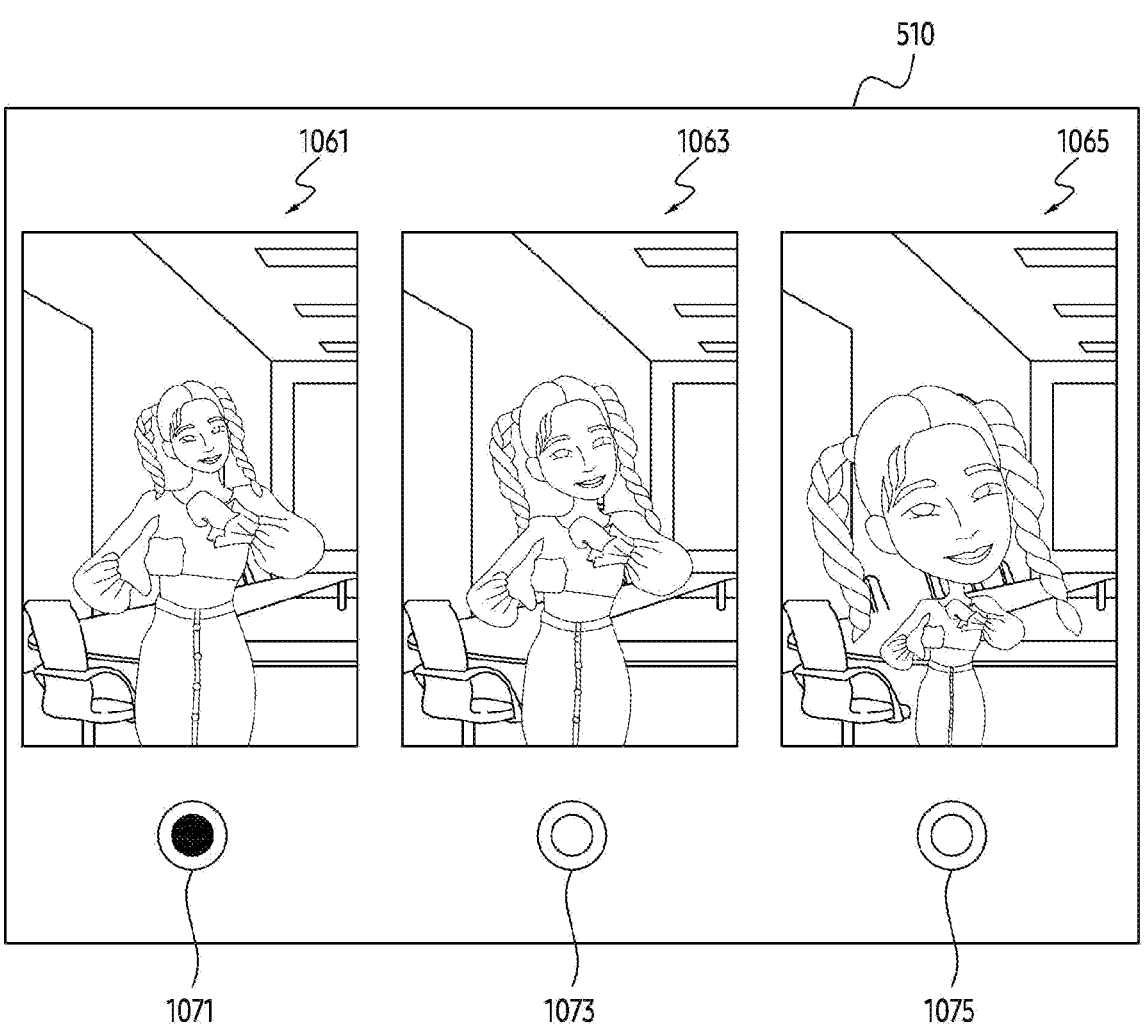
FIG. 10C is a diagram illustrating an example of an electronic device displaying visual objects having a body proportion determined according to candidate proportions according to various embodiments.

FIG. 10A is a flowchart illustrating an example method of generating an avatar based on candidate proportions identified based on a priority, according to various embodiments. FIG. 10B is a diagram illustrating example visual objects having a body proportion determined according to candidate proportions according to various embodiments. FIG. 10C is a diagram illustrating an example of an electronic device displaying visual objects having a body proportion determined according to candidate proportions according to various embodiments.

At least some of the method of FIG. 10A may be performed by an electronic device 101 of FIG. 5. For example, the at least some of the method may be controlled by a processor 120 of the electronic device 101. The method of FIG. 10A may include example operations for operations 640 to 670 of FIG. 6.

Referring to FIG. 10A, in operation 1010, the processor 120 may identify whether a designated body proportion exists. For example, the designated body proportion may include a fixed body proportion defined by the space, the situation, or the virtual object. For example, in case that the avatar corresponding to the user wears the virtual object, which is a clothing requiring the designated body proportion, the designated body proportion may be enforced.

In operation 1010, in case that it is identified that the designated body proportion exists, the processor 120 may perform operation 1040. In operation 1010, in case that it is identified that the designated body proportion does not exist, the processor 120 may perform operation 1020.

In operation 1020, the processor 120 may identify candidate proportions based on a reference priority and display visual objects having a body proportion according to the candidate proportions. For example, the processor 120 may identify the candidate proportions whose priority is greater than or equal to the reference priority among the proportions. For example, assume a case that the proportions include a first proportion, a second proportion, a third proportion, and other proportions, and that a priority value of the first proportion is 1, a priority value of the second proportion is 3, a priority value of the third proportion is 2, and a priority value of the other proportion is 4. In the above example, in case that a value of the reference priority is 3, the candidate proportions may include the first proportion, the third proportion, and the second proportion. For a method of identifying the candidate proportions, reference may be made to FIG. 10B.

Referring to FIG. 10B, the candidate proportions identified by the processor 120 may include a first proportion 1051 in which a proportion of a body to a face of the avatar is greater than or equal to a first value, a second proportion 1055 in which the proportion of the body to the face of the avatar is less than a second value, and a third proportion 1053 in which the proportion of the body to the face of the avatar is less than the first value and is equal to or greater than the second value. In other words, the first proportion 1051 may indicate a type having appearance in which a length of the body is a relatively long. The first proportion 1051 may be referred to as an adult proportion. The second proportion 1055 may indicate a type having an appearance in which the length of the body is a relatively short or a proportion having an appearance in which the face is enlarged. The second proportion 1055 may be referred to as a child proportion. The third proportion 1053 may be referred to as a default proportion. Referring to FIG. 10B, the processor 120 may identify the first proportion 1051, the third proportion 1053, and the second proportion 1055 among the proportions for the avatar corresponding to the user based on the reference priority. For a method of displaying the identified candidate proportions, reference may be made to FIG. 10c.

In FIG. 10C, an example of visual objects 1061, 1063, and 1065 indicating avatars having body proportions of the three candidate proportions 1051, 1053, and 1055 identified as illustrated in FIG. 10B is illustrated.

Referring to FIG. 10C, the processor 120 may display the visual object 1061 that is a preview of an avatar to be generated based on the first proportion 1051, the visual object 1063 that is a preview of an avatar to be generated based on the third proportion 1053, and the visual object 1065 that is a preview of an avatar to be generated based on the second proportion 1055. For example, the processor 120 may display the visual object 1061, the visual object 1063, and the visual object 1065 through a display 510. In addition, the processor 120 may display visual objects 1071, 1073, and 1075 for the user's selection together with the visual objects 1061, 1063, and 1065. For example, the visual object 1071 may be a visual object for notifying a selection for the visual object 1061. For example, the visual object 1073 may be a visual object for notifying a selection for the visual object 1063. For example, the visual object 1075 may be a visual object for notifying a selection for the visual object 1065. However, the present disclosure is not limited thereto. For example, in response to an input for a partial area of each of the visual objects 1061, 1063, and 1065, the processor 120 may identify a selection for a visual object corresponding to the partial area.

In operation 1030, the processor 120 may identify one visual object among the visual objects. In the example of FIG. 10C, the processor 120 may identify the visual object 1061 based on an input for the visual object 1071 among the visual objects 1071, 1073, and 1075 displayed through the display 510. For example, the processor 120 may obtain the input. For example, the input may include the user's touch input for the electronic device 101. The user's touch input for the electronic device 101 may include a touch for at least a portion of the display 510 and a gesture for an area on real space indicating the visual object 1071.

In operation 1040, the processor 120 may generate an avatar and an item having an identified body proportion. For example, the identified body proportion may include a body proportion (e.g., the first proportion) of the visual object (e.g., the visual object 1061 of FIG. 10C) identified through operation 1030. For example, the identified body proportion may include the designated body proportion described in operation 1010.

Referring to the above description, in FIGS. 10A, 10B and 10C, an example of a case in which the body proportion of the avatar corresponding to the user is changed is described, but the present disclosure is not limited thereto. For example, in case that the one visual object identified by the processor 120 in operation 1030 is the same as the body proportion currently used by the avatar, the processor 120 may omit operation 1040. Thereafter, the processor 120 may perform operation 680 of FIG. 6 to maintain a state in which the avatar is displayed.

Figure 11A:
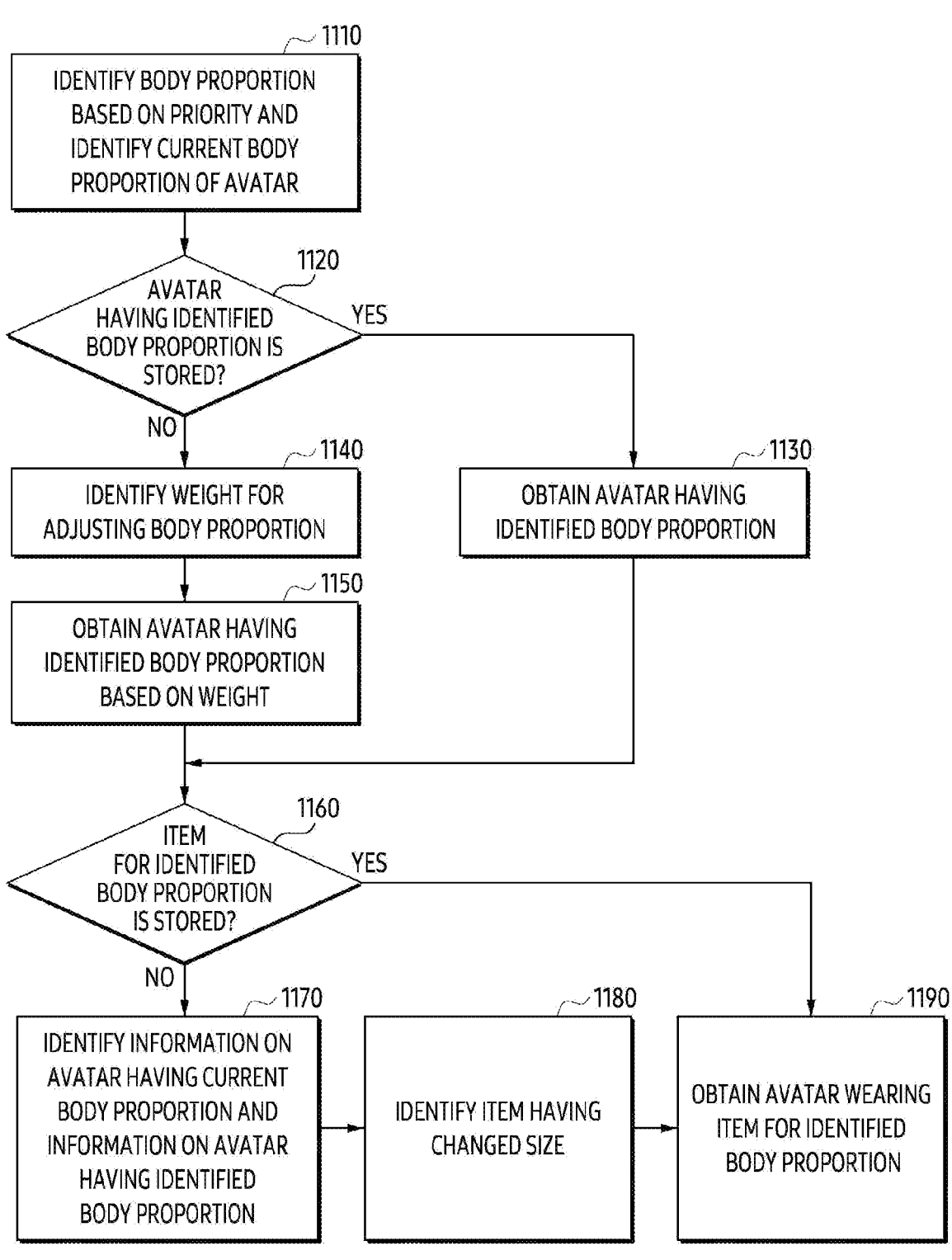
FIG. 11A is a flowchart illustrating an example method of obtaining an avatar and an item to be worn by the avatar based on an identified body proportion according to various embodiments.
Figure 11B:
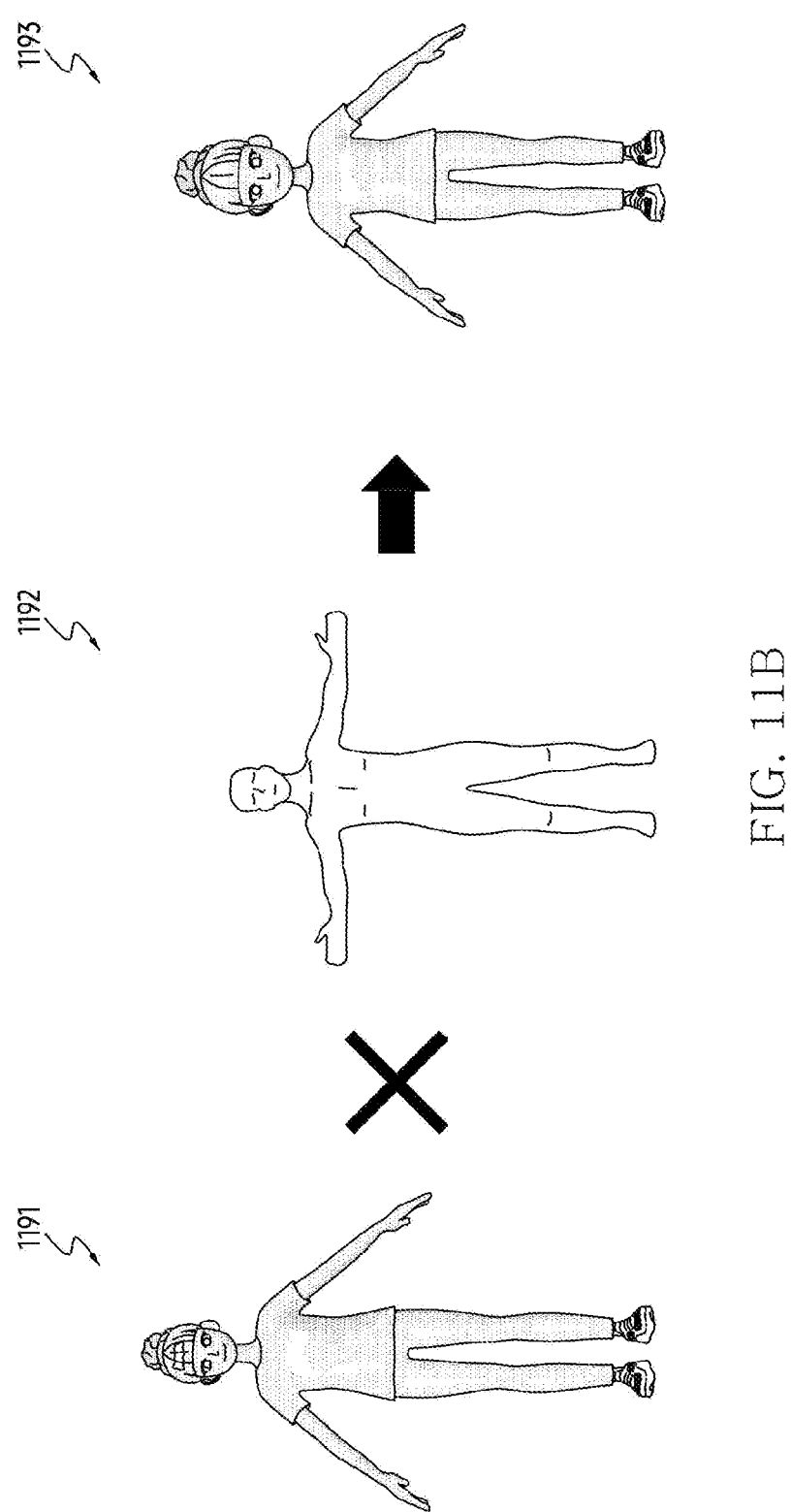
FIG. 11B is a diagram illustrating an example method of obtaining an avatar having an identified body proportion according to various embodiments.
Figure 11C:
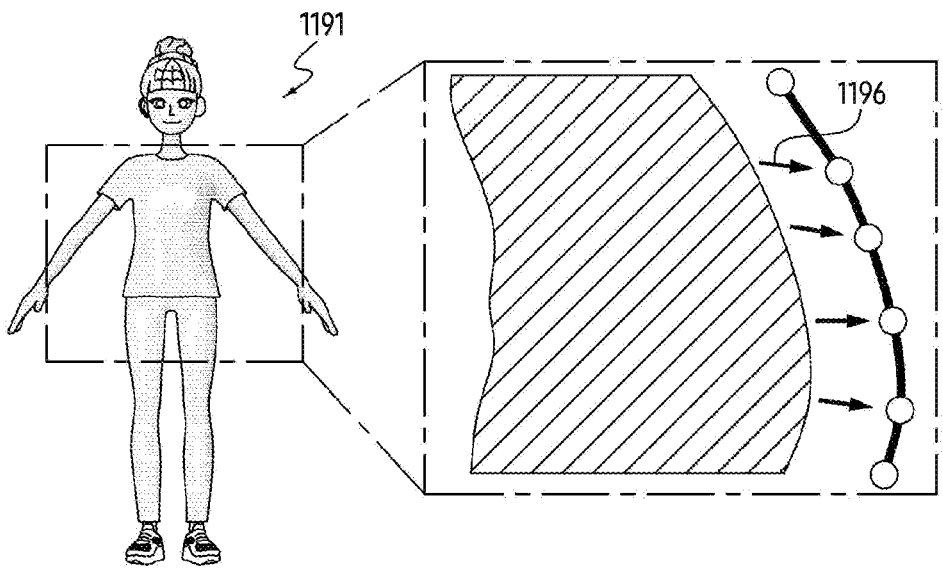
FIG. 11C is a diagram illustrating an example method of obtaining an item having an identified body proportion according to various embodiments.
Figure 11C:
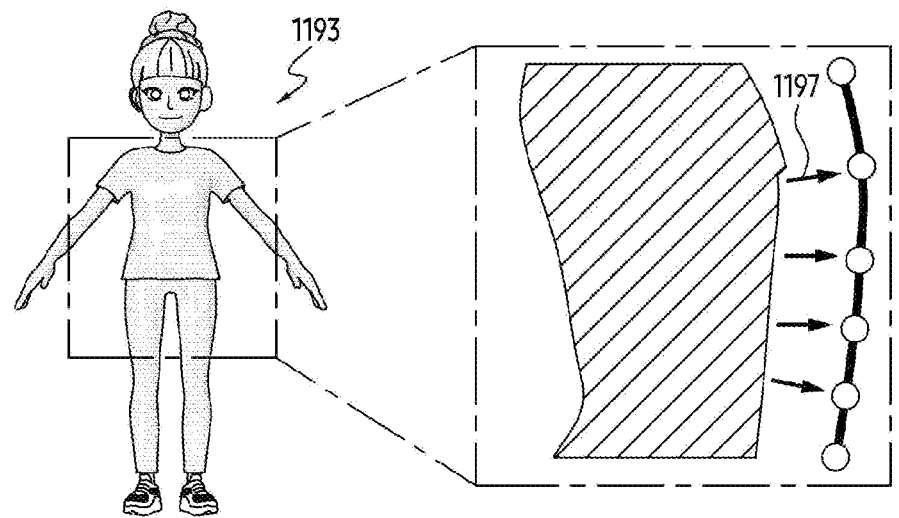

FIG. 11A is a flowchart illustrating an example method of obtaining an avatar and an item to be worn by the avatar based on an identified body proportion according to various embodiments. FIG. 11B is a diagram illustrating an example method of obtaining an avatar having an identified body proportion according to various embodiments. FIG. 11C is a diagram illustrating an example method of obtaining an item having an identified body proportion according to various embodiments.

At least some of the method of FIG. 11A may be performed by an electronic device 101 of FIG. 5. For example, the at least some of the method may be controlled by a processor 120 of the electronic device 101. The method of FIG. 11A may include example operations for operations 670 to 680 of FIG. 6.

Referring to FIG. 11A, in operation 1110, the processor 120 may identify a body proportion based on priority and may identify a current body proportion of the avatar. For example, the body proportion identified based on the priority may indicate a proportion of one visual object identified by operation 660 of FIG. 6 or operation 1030 of FIG. 10A. The avatar may indicate an avatar corresponding to a user of the electronic device 101. The current body proportion may indicate a proportion applied to the avatar. Hereinafter, for convenience of explanation, the current body proportion is assumed to be a first proportion, and the body proportion identified based on the priority is assumed to be a second proportion. The first proportion may be a different proportion from the second proportion. If the current body proportion and the identified body proportion are the same, the processor 120 may maintain or start displaying the avatar having the current body proportion in operation 680.

In operation 1120, the processor 120 may identify whether the avatar having the identified body proportion is stored. For example, the processor 120 may identify whether the avatar having the second proportion is stored in a memory 130 or an external electronic device 570. In operation 1120, in case that it is identified that the avatar having the second proportion is stored, the processor 120 may perform operation 1130. In operation 1120, in case that it is identified that the avatar having the second proportion is not stored, the processor 120 may perform operation 1140.

In operation 1130, the processor 120 may obtain the avatar having the identified body proportion. For example, the processor 120 may obtain the avatar having the second proportion from the memory 130 or the external electronic device 570. Obtaining the avatar having the second proportion may be understood in the same manner as obtaining information for generating the avatar having the second proportion. For example, the information may include mesh data for generating the avatar having the second proportion. The mesh data may include a mesh coordinate.

In operation 1140, the processor 120 may identify a weight for adjusting the body proportion. In operation 1150, the processor 120 may obtain the avatar having the identified body proportion based on the weight. For example, the weight may include a blend weight to be applied to a blend shape in order to change from the first proportion to the second proportion. According to operations 1140 and 1150, an example of FIG. 11B may be referred to for a method for identifying the weight and obtaining the avatar having the second proportion.

Referring to FIG. 11B, for example, the processor 120 may load mesh data 1191 for the avatar having the first proportion from the memory 130 or the external electronic device 570. For example, the mesh data 1191 may include information for generating the avatar having the first proportion. For example, the mesh data 1191 may include a mesh coordinate for generating the avatar having the first proportion. In addition, the processor 120 may identify weight 1192 for changing to the avatar having the second proportion. The processor 120 may obtain mesh data 1193 for generating the avatar having the second proportion by applying the weight 1192 to the mesh data 1191. For example, the processor 120 may generate the avatar having the second proportion (e.g., a child proportion) based on the mesh data 1193.

In FIGS. 11A and 11B, an example of changing from the first proportion, which is the current body proportion, to the second proportion is described, but the present disclosure is not limited thereto. For example, the processor 120 may obtain mesh data for a third proportion, which is a default proportion different from the current body proportion, and obtain the mesh data 1193 for generating the avatar having the second proportion using the weight 1192. In other words, in order to generate the avatar having the identified body proportion, the processor 120 may use information on the avatar having the default proportion.

Referring back to FIG. 11A, in operation 1160, the processor 120 may identify whether an item for the identified body proportion is stored. For example, the processor 120 may identify whether an item for the avatar having the second proportion is stored in the memory 130 or the external electronic device 570. The item may indicate a virtual object for an object (e.g., clothes) to be worn by the avatar. In operation 1160, in case that it is identified that the item for the second proportion is stored, the processor 120 may perform operation 1190. In operation 1160, in case that it is identified that the item for the second proportion is not stored, the processor 120 may perform operation 1170.

In operation 1170, the processor 120 may identify information on the avatar having the current body proportion and information on the avatar having the identified body proportion. In operation 1180, the processor 120 may identify an item having a changed size. For example, the information on the avatar having the current body proportion may include the mesh data (e.g., the mesh data 1191) for generating the avatar having the first proportion. For example, the information on the avatar having the identified body proportion may include the mesh data (e.g., the mesh data 1193) for generating the avatar having the second proportion. For example, the processor 120 may identify an item having the changed size to be worn by the avatar having the second proportion using the relative coordinate between the mesh data 1191 and the item worn by the avatar having the first proportion. According to operations 1170 and 1180, an example of FIG. 11C may be referred to for a method for identifying the relative coordinate and obtaining the item for the second proportion.

FIG. 11C illustrates the mesh data 1191 for generating the avatar having the first proportion and the mesh data 1193 for generating the avatar having the second proportion. The processor 120 may identify a relative coordinate 1196 between the mesh data 1191 and the item worn by the avatar having the first proportion. For example, the relative coordinate 1196 may be defined as a distance or a difference in coordinate values between one point of the mesh data 1191 and one point of the item. The processor 120 may adjust the relative coordinate 1196 to be applied to the mesh data 1193. For example, the adjusted relative coordinate may be a relative coordinate 1197. The processor 120 may identify the item for the second proportion based on the relative coordinate 1197. In other words, the processor 120 may identify the item having the changed size.

In FIGS. 11A and 11C, an example of changing from an item for the first proportion, which is the current body proportion, to the item for the second proportion is described, but the present disclosure is not limited thereto. For example, the processor 120 may obtain mesh data for the third proportion, which is a different from the current body proportion, and may obtain the item for the second proportion using a relative coordinate between the mesh data for the third proportion and an item for the third proportion. In other words, in order to generate the item for the identified body proportion, the processor 120 may use the information on the avatar having the default proportion.

Referring back to FIG. 11A, in operation 1190, the processor 120 may obtain an avatar wearing the item for the identified body proportion. For example, according to operation 1160, the processor 120 may obtain the item for the second proportion from the memory 130 or the external electronic device 570, and may generate the avatar having the second proportion wearing the item for the second proportion. The processor 120 may generate the avatar having the second proportion wearing the item for the second proportion identified according to operations 1170 and 1180.

Although not illustrated in FIG. 11A, the processor 120 may store the avatar having the second proportion obtained (or generated) through operations 1130 to 1140 and the item for the second proportion obtained (or generated) through operations 1170 to 1180, in the memory 130 or the external electronic device 570. In other words, the processor 120 may store information on an avatar or item having a newly identified proportion. The processor 120 may then obtain the avatar or item having the newly identified proportion from the memory 130 or the external electronic device 570. Accordingly, a processing time for adjusting the proportion is reduced, and a server resource of the external electronic device 570 may be efficiently used.

Figure 12:
FIG. 12 is a diagram illustrating examples of an avatar having an adjusted proportion based on a space of a virtual environment according to various embodiments.
Figure 12:

FIG. 12 is a diagram illustrating examples of an avatar having an adjusted proportion based on a space of a virtual environment according to various embodiments.

FIG. 12 illustrates examples 1200 and 1250 of displaying the avatar corresponding to a user of an electronic device 101 whose body proportion is adjusted based on the space. Referring to examples 1200 and 1250, the electronic device 101 (or the processor 120) may display the virtual environment including the avatar through a display 510.

Referring to example 1200, the processor 120 may display an avatar in which a body proportion is adjusted to a first proportion based on information related to the space. For example, the first proportion may be referred to as an adult proportion. For example, the processor 120 may obtain information on a type of the space, a purpose of the space, a situation within the space, or a body proportion of avatars within the space. For example, the processor 120 may identify that the space is a bar, that the purpose of the space or the situation within the space is drinking, and that the body proportion of the avatars is the first proportion. For example, based on identifying that the space is the bar, the processor 120 may identify that proportion information for the space is the first proportion. For example, based on identifying that the purpose of the space or the situation is drinking, the processor 120 may identify that the proportion information for the situation is the first proportion. For example, as the processor 120 identifies that the body proportion of the avatars is the first proportion, the processor 120 may identify that the proportion information for the avatars is the first proportion. For example, as the processor 120 identifies the first proportion, the processor 120 may generate an avatar in which a body proportion of an avatar corresponding to the user is adjusted to the first proportion. In addition, the avatar may be in a state in which an item for the first proportion is worn. For example, the processor 120 may display the avatar adjusted to the first proportion through the display 510.

Referring to example 1250, the processor 120 may display an avatar in which the body proportion is adjusted to a second proportion based on the information related to the space. For example, the second proportion may be referred to as a child proportion. For example, the processor 120 may obtain the information on the type of the space, the purpose of the space, the situation within the space, or the body proportion of avatars within the space. For example, the processor 120 may identify that the space is an amusement park, and that the purpose of the space or the situation within the space is play. For example, based on identifying that the space is the amusement park, the processor 120 may identify that the proportion information for the space is the second proportion. For example, based on identifying that the purpose of the space or the situation is the play, the processor 120 may identify that the proportion information for the situation is the second proportion. For example, as the processor 120 identifies that the body proportion of the avatars is the second proportion, the processor 120 may identify that the proportion information for the avatars is the second proportion. For example, as the processor 120 identifies the second proportion, the processor 120 may generate the avatar in which the body proportion of the avatar corresponding to the user is adjusted to the second proportion. In addition, the avatar may be in a state in which an item for the second proportion is worn. For example, the processor 120 may display the avatar adjusted to the second proportion through the display 510.

Referring to the above description, the electronic device and method according to an embodiment of the present disclosure may generate and display an avatar having a body proportion that is flexibly adjusted according to a changed space within the virtual environment. Accordingly, the electronic device and method according to an embodiment of the present disclosure may provide the immersive user experience to the user by providing an avatar having a proportion optimized for the space.

Figure 13:
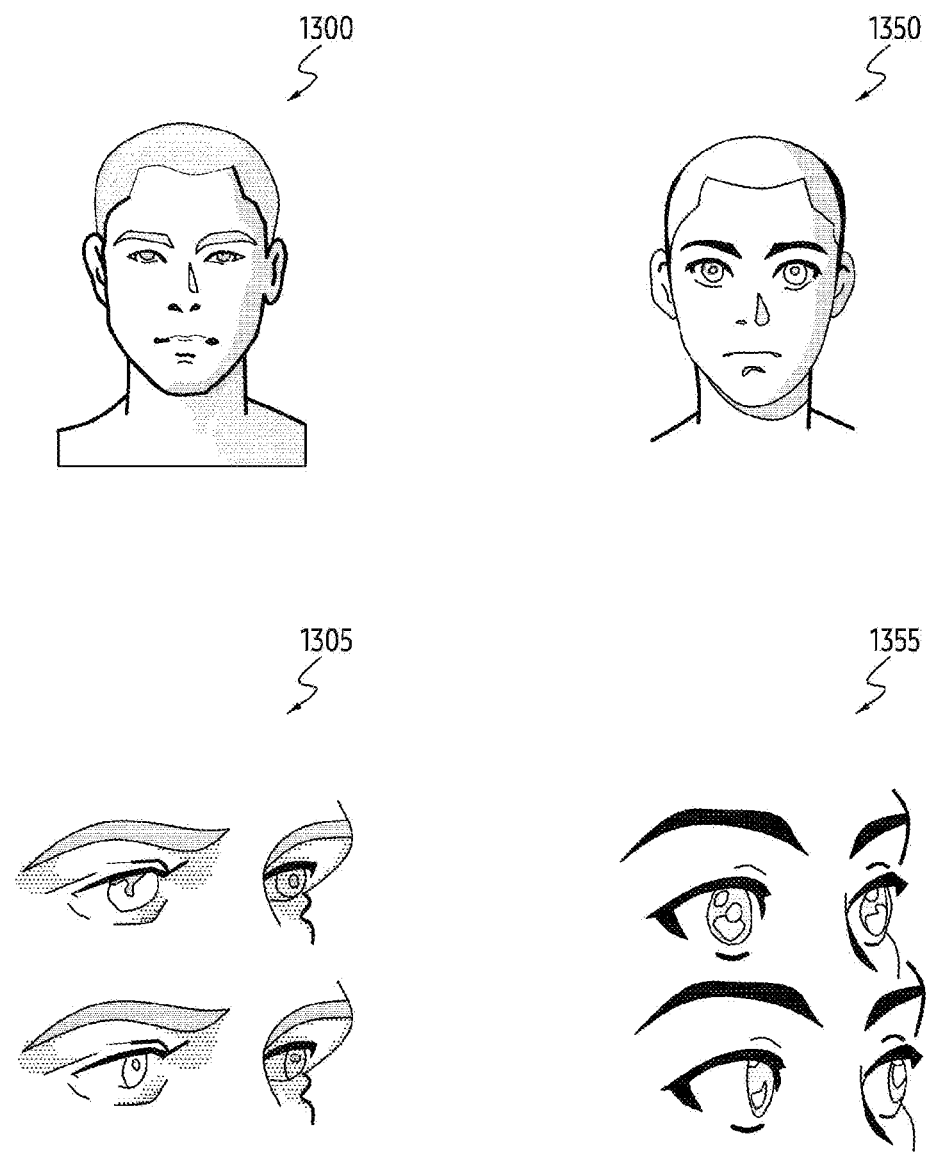
FIG. 13 is a diagram illustrating an example of a portion of an avatar having an adjusted proportion based on a space of a virtual environment according to various embodiments.

FIG. 13 is a diagram illustrating examples of a portion of an avatar having an adjusted proportion based on a space of a virtual environment according to various embodiments.

Referring to FIG. 13, examples 1300 and 1350 illustrate an example of a method of adjusting a proportion of a portion of an avatar's body, unlike an avatar having a body proportion adjusted based on the space illustrated, for example, in FIGS. 4 to 12. The examples 1300 and 1350 illustrate an example of a method of adjusting proportion within a face of the body.

Referring to the example 1300, the avatar may include components a face having a proportion similar to proportion of a person's face in reality. For example, ears, eyes, mouth, and nose of the avatar's face may be implemented based on an average proportion of people in the real world. Referring to example 1305, the eyes, eyebrows, pupils, and facial skeleton may be configured based on the average proportion.

Referring to the example 1350, the avatar may include components within a face that have cartoon-style proportion. For example, ears, eyes, mouth, and nose of the avatar's face may be implemented with an enlarged eye than the average proportion of people in the real world. Referring to example 1355, the eyes and pupils may be configured to have an enlarged proportion than the average proportion.

As described above, a method of adjusting a proportion of a portion of the body may be applied in the same manner as a method of adjusting a proportion of the avatar. For example, the method of adjusting the proportion of the portion of the body may be changed based on a blend shape and a blend weight of the face.

FIG. 14 is a flowchart illustrating an example method of displaying an avatar having an adjusted proportion based on a space, a situation, and avatars of a virtual environment according to various embodiments.

At least some of the method of FIG. 14 may be performed by an electronic device 101 of FIG. 5. For example, the at least some of the method may be controlled by a processor 120 of the electronic device 101. The method of FIG. 14 may include at least a portion of a method of FIG. 6.

Referring to FIG. 14, in operation 1410, the processor 120 may obtain information on a space of the virtual environment, information on a situation related to the space, and information on a body proportion of avatars located within the space. For example, the processor 120 may obtain information related to the space of the virtual environment. For example, the space may include a three-dimensional area defined within the virtual environment. For example, the space may be set by an external electronic device (e.g., a server) that provides the virtual environment. For example, each of a plurality of spaces within the virtual environment may be distinguished by being set by the external electronic device. For example, the space may indicate a space in which an avatar corresponding to a user of the electronic device 101 is located in the virtual environment. For example, the information related to the space may include at least some of information on the space within the virtual environment, information on a situation related to the space, information on avatars located within the space, or information on a virtual object located within the space.

For example, the processor 120 may obtain the information related to the space from an external electronic device 570 providing the virtual environment. For example, the external electronic device 570 may include a server that provides the virtual environment.

For example, the information on the space may include at least one of a name of the space provided by the virtual environment, a purpose of the space, a role of an avatar corresponding to the user within the space, and a style of the space. For example, the purpose of the space may include meetings, lectures, listening to music, drinking, and freedom. For example, the role of the avatar may include a host, a participant, and a third party. For example, the style of the space may include reality and cartoon.

For example, the information on the situation may include contents in progress within the space. For example, the content may include context progressing within the space, such as business meetings, play, listening to music, and games.

For example, the information on the avatars may include body proportions for the avatars of other users located within the space. For example, the body proportions for the avatars of the other users may be identified based on a blend shape for generating the avatar or a blend weight for adjusting the blend shape. The body proportions for the avatars of the other users may be identified for each avatar.

For example, information on the virtual object may include a name for objects included within the space, a shape or structure of the objects, or an age of use of the objects. For example, the name for the objects may include alcohol and cars. For example, the age of use of the objects may include those for adults, infants, teenagers, or the elderly. For example, the virtual object may indicate an object capable of interacting with the avatar.

For example, the information related to the space may be obtained based on an event for obtaining the information related to the space. For example, the event may include a length of a designated time interval in which the avatar corresponding to the user of the electronic device 101 is located in the space. For example, the length may be referred to as a period (or obtaining period) of the designated time interval.

For example, the processor 120 may obtain user input information input by the user. For example, the user input information may include information on the avatar corresponding to the user or information on the user. For example, the user input information may be obtained before obtaining the information related to the space. For example, the user input information may be input by the user when an application providing the virtual environment is executed. The user input information may be obtained in response to the input.

In operation 1420, the processor 120 may obtain first proportion information defined in the space, second proportion information defined in the situation, and third proportion information used by the avatars. The avatars may indicate avatars of other users different from the user of the electronic device 101.

For example, the processor 120 may identify the first proportion information, the second proportion information, and the third proportion information based on the information on the space, the information on the situation, and the information on the body proportion of the avatars obtained within the designated time interval. For example, the processor 120 may identify the first proportion information defined in the space based on the information on the space and mapping information. For example, the processor 120 may identify the second proportion information defined in the situation based on the information on the space and the mapping information. For example, the mapping information may include proportion information mapped with respect to information on a type of the space, a purpose of the space, a role of the avatar within the space, a situation related to the space, the virtual object, and an avatar corresponding to a user of the electronic device 101. In addition, the processor 120 may identify the third proportion information by identifying a body proportion most frequently used by the avatars based on the information on the body proportion of the avatars. For example, the first proportion information, the second proportion information, and the third proportion information may be referred to as analysis data for the designated time interval. In case that the designated time interval includes a current timing, the analysis data may be referred to as current analysis data.

In operation 1430, the processor 120 may identify a priority for each of proportions for the avatar. For example, the avatar may indicate the avatar corresponding to the user of the electronic device 101. For example, the proportions for the avatar may indicate proportions that may be applied to the avatar. For example, the proportions may indicate all proportions identified based on the information related to the space and the user input information.

For example, the processor 120 may identify whether an event for identifying candidate proportions among the proportions has occurred by comparing the current analysis data and past analysis data. The past analysis data may be stored in a memory 130 of the electronic device 101 or the external electronic device 570. For example, the processor 120 may compare the past analysis data with the current analysis data. For example, the processor 120 may identify whether the event has occurred based on the comparison between the current analysis data and the past analysis data.

For example, the event for identifying the candidate proportions may include a change in a space in which an avatar corresponding to a user of the electronic device 101 is located or a change in a situation. For example, the change in the space may include a case in which the avatar corresponding to the user enters a new space. For example, the change in the situation may include a case in which content that indicates a motion or action performed by the avatar is changed. For example, the change in the situation may include a case in which a lecture is terminated and changed to a break time in a situation of an avatar listening to the lecture. In addition, the event may include a case in which candidate proportions for the avatar include only one proportion. For example, the event may include a case in which a proportion indicated by all elements is the same. In addition, the event may include a case in which the avatar perform interaction with virtual objects within the space.

The event may include, for example, a case in which the avatar boards a virtual object indicating a car, or a case in which the avatar starts smoking using a virtual object indicating a cigarette.

For example, in case that the processor 120 identifies the event for identifying the candidate proportions, the processor 120 may store the current analysis data in the memory 130 or the external electronic device 570. In other words, in case that the current analysis data has changed compared to the past analysis data, the processor 120 may store the current analysis data. In this case, the processor 120 may prevent and/or reduce unnecessary accumulation of the past analysis data and may delete at least some of the past analysis data in consideration of limitations in capacity of the memory 130 or the external electronic device 570.

For example, the processor 120 may update duration time in case that the event for identifying the candidate proportions is not identified. For example, the duration time may indicate a time for indicating the validity of the past analysis data. For example, updating the duration time may be understood as extending the duration time. In other words, the processor 120 may maintain the past analyzed data without storing the current analyzed data as it identifies that the current analyzed data has not changed compared to the past analyzed data. For example, the duration time may be defined based on a difference between the startime and the endtime of the Table 1. For example, the duration time may be updated as the endtime is changed.

For example, in case that the processor 120 identifies the event for identifying the candidate proportions, the processor 120 may identify the priority for each of the proportions for the avatar based on the current analysis data. For example, the processor 120 may identify the priority for each of the proportions in response to identifying the event.

For example, the processor 120 may identify the priority for each of the proportions for the avatar based on the current analysis data. For example, the proportions may include a proportion indicated by the proportion information included in the analysis data. For example, in case that the proportion information for the space in the analysis data is a first proportion, the proportion information for the situation is a second proportion, the proportion information for the avatars is the first proportion, the proportion information for the virtual object is a third proportion, the user's preferred proportion information is the first proportion, and the proportion information for the user's age is the second proportion, the proportions may include the first proportion, the second proportion, and the third proportion.

For example, the processor 120 may identify a count for each of the proportions. In the above example, the processor 120 may identify the number of the first proportion as 3, the number of the second proportion as 2, and the number of the third proportion as 1. The processor 120 may identify a priority value for the first proportion as 1, a priority value for the second proportion as 2, and a priority value for the third proportion as 3. For example, a lower priority value may indicate a higher priority. Accordingly, the processor 120 may identify the priority for each of the proportions based on the number for each of the proportions.

However, the present disclosure are not limited thereto. For example, the processor 120 may identify the priority using an artificial intelligence model (AI model). For example, the processor 120 may input the analysis data into the artificial intelligence model (AI model). In other words, the analysis data may be an input of the artificial intelligence model (AI model). Accordingly, the processor 120 may obtain the priority, which is an output of the artificial intelligence model (AI model). Referring to the above description, the processor 120 may identify the priority using a statistical technique or a deep learning technique using the artificial intelligence model (AI model). For example, the statistical technique may include a decision tree. For example, in the above-described example, it may be difficult for the processor 120 to identify the priority value of each of the proportions based on the number for each of the proportions. For example, in case that the number of the first proportion and the number of the second proportion are the same, since the priority between the first proportion and the second proportion is not distinguished, it may be difficult for the processor 120 to identify the priority value. Based on the statistical technique, in case of identifying a record in which the user selected the first proportion more than the second proportion, the processor 120 may identify the first proportion as a higher priority (e.g., a lower priority value) than the second proportion. For example, using the artificial intelligence model (AI model), the processor 120 may identify a body proportion of an avatar to be used in the future through the current analysis data.

In operation 1440, the processor 120 may display the avatar having the second proportion changed from the first proportion. For example, the processor 120 may display the avatar having the second proportion changed from the first proportion through a display 510, based on the priority. For example, the first proportion may indicate a current body proportion of the avatar before being changed. For example, the first proportion may indicate a proportion in which the proportion of the body to the face of the avatar is greater than or equal to a first value. The second proportion may indicate the body proportion of the avatar to be changed according to a body proportion identified based on the priority. For example, the second proportion may indicate a proportion in which the proportion of the body to the face of the avatar is less than a second value. For example, the first value may be a value greater than the second value. In other words, the first proportion may indicate a type in which length of the body has a relatively long appearance. The above example is for convenience of explanation, and the present disclosure is not to be interpreted as limited to the above example. For example, the body proportion of the avatar may be changed from the second proportion to the first proportion. For example, the first proportion and the second proportion may be defined or set to have different proportions.

For example, the processor 120 may identify whether a designated body proportion exists. For example, the designated body proportion may include a fixed body proportion defined by the space, the situation, or the virtual object. For example, in case that the avatar corresponding to the user wears the virtual object, which is a clothing requiring the designated body proportion, the designated body proportion may be enforced.

For example, in case that the processor 120 identifies that the designated body proportion does not exist, the processor 120 may identify the candidate proportions based on the reference priority and may display visual objects having the body proportion according to the candidate proportions. For example, the processor 120 may identify one visual object among the visual objects. For example, in response to obtaining an input for the one visual object, the processor 120 may identify the visual object among the visual objects. For example, the processor 120 may generate an avatar and an item having the identified body proportion. For example, the identified body proportion may include a body proportion of the visual object. In the example of FIG. 14, the identified body proportion may be the second proportion.

For example, the processor 120 may identify the current body proportion of the avatar. In the example of FIG. 14, the current body proportion may be the first proportion. For example, the processor 120 may identify whether the avatar having the identified body proportion is stored. For example, the processor 120 may identify whether the avatar having the second proportion is stored in a memory 130 or an external electronic device 570.

For example, in case that it is identified that the avatar having the second proportion is stored, the processor 120 may obtain the avatar having the identified body proportion. For example, the processor 120 may obtain the avatar having the second proportion from the memory 130 or the external electronic device 570. Obtaining the avatar having the second proportion may be understood in the same manner as obtaining information for generating the avatar having the second proportion. For example, the information may include mesh data for generating the avatar having the second proportion. The mesh data may include a mesh coordinate.

For example, in case that it is identified that the avatar having the second proportion is not stored, the processor 120 may identify a weight for adjusting the body proportion. The processor 120 may obtain the avatar having the identified body proportion based on the weight. For example, the weight may include a blend weight to be applied to a blend shape in order to change from the first proportion to the second proportion.

For example, the processor 120 may identify whether an item for the identified body proportion is stored. For example, the processor 120 may identify whether an item for the avatar having the second proportion is stored in the memory 130 or the external electronic device 570. The item may indicate a virtual object for an object (e.g., clothes) to be worn by the avatar.

For example, in case that the processor 120 identifies that an item for the second proportion is not stored, the processor 120 may identify information on an avatar having the current body proportion and information on the avatar having the identified body proportion. For example, the processor 120 may identify an item having a changed size. For example, the information on the avatar having the current body proportion may include mesh data (e.g., mesh data 1191 of FIG. 11B) for generating an avatar having the first proportion. For example, the information on the avatar having the identified body proportion may include mesh data (e.g., mesh data 1193 of FIG. 11B) for generating the avatar having the second proportion. For example, the processor 120 may identify an item having the changed size to be worn by the avatar having the second proportion using the relative coordinate between the mesh data 1191 and the item worn by the avatar having the first proportion. For example, the processor 120 may obtain an avatar wearing the item for the identified body proportion. For example, the processor 120 may obtain the item for the second proportion from the memory 130 or the external electronic device 570 and may generate the avatar having the second proportion wearing the item for the second proportion. The processor 120 may generate the avatar having the second proportion wearing the item for the identified second proportion.

For example, the processor 120 may display the avatar wearing the item for the identified body proportion through a display. For example, the processor 120 may display the avatar having the second proportion within the space through the display.

Referring to the above description, the electronic device and method according to an example embodiment of the present disclosure may generate and display an avatar having a body proportion that is flexibly adjusted according to a changed space within the virtual environment. Accordingly, the electronic device and method according to an embodiment of the present disclosure may provide the immersive user experience to the user by providing an avatar having a proportion optimized for the space. In addition, the electronic device and method according to an embodiment of the present disclosure may improve the satisfaction and utilization of a service for the virtual environment, by providing the user with an option of an avatar having various proportions, by providing a preview of an avatar having candidate proportions related to the space. In addition, the electronic device and method according to an embodiment of the present disclosure may provide the virtual environment including various types of spaces, by providing a body proportion of the avatar suitable for the space.

As described above, according to an example embodiment, an electronic device may comprise memory storing instructions. The electronic device may comprise a display. The electronic device may comprise at least one processor comprising processing circuitry. The instructions, when executed by at least one processor individually and/or collectively, may cause the electronic device to obtain, from an external electronic device providing a virtual environment, information on a space of the virtual environment in which an avatar is to be located, information on a situation related to the space, and information on body proportion of avatars located in the space. The instructions, when executed by at least one processor individually and/or collectively, may cause the electronic device to identify, first proportion information of an avatar defined in the space, second proportion information of an avatar defined in the situation, and third proportion information used by the avatars based on the information on the space, the information on the situation, and the information on the body proportion of the avatars. The instructions, when executed by at least one processor individually and/or collectively, may cause the electronic device to identify a priority with respect to proportions for the avatars based on the first proportion information, the second proportion information, and the third proportion information. The instructions, when executed by at least one processor individually and/or collectively, may cause the electronic device to display, through the display, the avatar having a second proportion changed from a first proportion in the space, based on the priority.

In an example embodiment, the instructions, when executed by at least one processor individually and/or collectively, may cause the electronic device to identify a count for each of the proportions based on the first proportion information, the second proportion information, and the third proportion information. At least one processor, individually and/or collectively may be configured to identify the priority based on the count for each of the proportions. The instructions, when executed by at least one processor individually and/or collectively, may cause the electronic device to based on a count of the second proportion being more than a count of the first proportion from among the proportions, wherein a priority of the second proportion is higher than a priority of the first proportion.

In an example embodiment, the instructions, when executed by at least one processor individually and/or collectively, may cause the electronic device to identify the priority using an artificial intelligence model based on an input including the first proportion information, the second proportion information, and the third proportion information. The priority may be included in an output of the artificial intelligence model.

In an example embodiment, the instructions, when executed by at least one processor individually and/or collectively, may cause the electronic device to identify candidate proportions having the priority being higher than or equal to a reference priority from among the proportion. The instructions, when executed by at least one processor individually and/or collectively, may cause the electronic device to display, through the display, visual objects having a body proportion determined according to the candidate proportions. The instructions, when executed by at least one processor individually and/or collectively, may cause the electronic device to identify the second proportion based on obtaining an input for the visual objects.

In an example embodiment, the instructions, when executed by at least one processor individually and/or collectively, may cause the electronic device to identify an event for identifying the candidate proportions. The instructions, when executed by at least one processor individually and/or collectively, may cause the electronic device to identify the candidate proportions in response to the event. The event may include a change of the space, or a change of the situation.

In an example embodiment, the third proportion information may include a proportion corresponding to a value of a body proportion which is most frequently used body proportion from among a body proportion for each of the avatars. The avatars may be located within a designated distance from a location of the avatar in the space.

In an example embodiment, the proportions may include the first proportion in which a proportion of a body to a face of an avatar is higher than or equal to a first value, the second proportion in which a proportion of a body to a face of an avatar is lower than a second value, the third proportion in which a proportion of a body to a face of an avatar is lower than the first value and higher than or equal to the second value.

In an example embodiment, the information on the space may include at least one of a name of the space provided in the virtual environment, a role of the avatar in the space, or a style of the space. The information on the situation may include contents taking place in the space.

In an example embodiment, the instructions, when executed by at least one processor individually and/or collectively, may cause the electronic device to obtain information on a virtual object located in the space. The instructions, when executed by at least one processor individually and/or collectively, may cause the electronic device to identify fourth proportion information of an avatar required with respect to the virtual object. The instructions, when executed by at least one processor individually and/or collectively, may cause the electronic device to identify a priority for each of the proportions based on the first proportion information, the second proportion information, the third proportion information, and the fourth proportion information.

In an example embodiment, the instructions, when executed by at least one processor individually and/or collectively, may cause the electronic device to obtain information on an user of the avatar. The instructions, when executed by at least one processor individually and/or collectively, may cause the electronic device to identify fifth proportion information of an avatar preferred by the user, based on the information on the user. At least one processor, individually and./or collectively, may be configured to identify a priority for each of the proportions based on the first proportion information, the second proportion information, the third proportion information, and the fifth proportion information. The information on the user may include at least one of a proportion of the avatar preferred by the user, a record for a proportion of the avatar used by the user, or appearance of the user.

In an example embodiment, the instructions, when executed by at least one processor individually and/or collectively, may cause the electronic device to identify the first proportion of the avatar in response to identifying the second proportion. The instructions, when executed by at least one processor individually and/or collectively, may cause the electronic device to identify whether information on an avatar adjusted as the second proportion is stored in the memory. The instructions, when executed by at least one processor individually and/or collectively, may cause the electronic device to obtain the avatar having the second proportion generated by the information on the avatar in case that the information on the avatar is stored in the memory. The instructions, when executed by at least one processor individually and/or collectively, may cause the electronic device to obtain the avatar having the second proportion changed from the first proportion by applying a weight for changing from the first proportion to the second proportion to the first proportion in case of identifying that the information on the avatar is not stored in the memory.

In an example embodiment, the instructions, when executed by at least one processor individually and/or collectively, may cause the electronic device to identify whether an item for the second proportion exists. The instructions, when executed by at least one processor individually and/or collectively, may cause the electronic device to obtain the avatar wearing the item in response to identifying that the item exists.

In an example embodiment, the instructions, when executed by at least one processor individually and/or collectively, may cause the electronic device to identify first mesh coordinates of the avatar having the first proportion and second mesh coordinates of the avatar having the second proportion in response to identifying the item does not exist. The instructions, when executed by at least one processor individually and/or collectively, may cause the electronic device to identify relative coordinates between the first mesh coordinates and another item worn by the avatar having the first proportion. The instructions, when executed by at least one processor individually and/or collectively, may cause the electronic device to change a size of the another item based on the relative coordinates. The instructions, when executed by at least one processor individually and/or collectively, may cause the electronic device to obtain the avatar having the second proportion wearing the another item having the changed size.

In an example embodiment, the instructions, when executed by at least one processor individually and/or collectively, may cause the electronic device to store the information on the space, the information on the situation, and the information on the body proportion of the avatars obtained within a designated time interval in the memory. The instructions, when executed by at least one processor individually and/or collectively, may cause the electronic device to delete information obtained within a time interval before the designated time interval from the memory. A length of the designated time interval may be changeable based on a capacity of the memory.

As described above, according to an example embodiment, a method performed by an electronic device may comprise obtaining, from an external electronic device providing a virtual environment, information on a space of the virtual environment in which an avatar is to be located, information on a situation related to the space, and information on body proportion of avatars located in the space. The method may comprise identifying, first proportion information of an avatar defined in the space, second proportion information of an avatar defined in the situation, and third proportion information used by the avatars based on the information on the space, the information on the situation, and the information on the body proportion of the avatars. The method may comprise identifying a priority with respect to proportions for the avatars based on the first proportion information, the second proportion information, and the third proportion information. The method may comprise displaying, through the display of the electronic device, the avatar having a second proportion changed from a first proportion in the space, based on the priority.

In an example embodiment, the method may comprise identifying a count for each of the proportions based on the first proportion information, the second proportion information, and the third proportion information. The method may comprise identifying the priority based on the count for each of the proportions. The method may comprise based on a count of the first proportion being more than a count of the second proportion from among the proportions, wherein a priority of the first proportion is higher than a priority of the second proportion.

In an example embodiment, the method may comprise identifying the priority using an artificial intelligence model based on an input including the information on the first proportion information, the second proportion information, and the third proportion information. The priority may be included in an output of the artificial intelligence model.

In an example embodiment, the method may comprise identifying candidate proportions having the priority being higher than or equal to a reference priority from among the proportion. The method may comprise displaying, through the display, visual objects having a body proportion determined according to the candidate proportions. The method may comprise identifying the second proportion based on obtaining an input for the visual objects.

In an example embodiment, the method may comprise identifying an event for identifying the candidate proportions. The method may comprise identifying the candidate proportions in response to the event. The event may include a change of the space, or a change of the situation.

As described above, according to an example embodiment, a non-transitory computer-readable storage medium, may store one or more programs including instructions that when executed by at least one processor of an electronic device, individually and/or collectively, cause the electronic device to: obtain, from an external electronic device providing a virtual environment, information on a space of the virtual environment in which an avatar is to be located, information on a situation related to the space, and information on body proportion of avatars located in the space; identify, first proportion information of an avatar defined in the space, second proportion information of an avatar defined in the situation, and third proportion information used by the avatars based on the information on the space, the information on the situation, and the information on the body proportion of the avatars; identify a priority with respect to proportions for the avatars based on the first proportion information, the second proportion information, and the third proportion information; and display, through a display of the electronic device, the avatar having a second proportion changed from a first proportion in the space, based on the priority.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising,
memory storing instructions;
a display; and
at least one processor, comprising processing circuitry,
wherein the instructions, when executed by the at least
one processor individually and/or collectively, cause
the electronic device to:
obtain, from an external electronic device providing a
virtual environment, information on a space of the
virtual environment in which an avatar corresponding to a user of the electronic device is to be
positioned, information on a situation related to the
space, and information on body proportions of avatars positioned in the space;
identify, first proportion information of an avatar
defined by the space, second proportion information
of an avatar defined in by the situation, and third
proportion information used by the avatars;

identify a priority with respect to proportions for the
avatar corresponding to the user of the electronic
device, based on the first proportion information, the
second proportion information, and the third proportion information; and
display, through the display, the avatar corresponding
to the user of the electronic device with a second
proportion changed from a first proportion in the
space, based on the priority.

2. The electronic device of claim 1,
wherein the instructions, when executed by the at least
one processor individually and/or collectively, cause
the electronic device to:
identify a count for each of the proportions, based on the
first proportion information, the second proportion
information, and the third proportion information; and
identify the priority, based on the count for each of the
proportions,
wherein a priority of the second proportion is higher than
a priority of the first proportion, based on a count of the
second proportion being more than a count of the first
proportion from among the proportions.

3. The electronic device of claim 1,
wherein the instructions, when executed by the at least
one processor individually and/or collectively, cause
the electronic device to:
identify the priority using an artificial intelligence model,
based on an input including the first proportion information, the second proportion information, and the
third proportion information,
wherein the priority is included in an output of the
artificial intelligence model.

4. The electronic device of claim 1,
wherein the instructions, when executed by the at least
one processor individually and/or collectively, cause
the electronic device to:
identify candidate proportions having the priority being
higher than or equal to a reference priority from among
the proportions;
display, through the display, visual objects having a body
proportion determined according to the candidate proportions; and
identify the second proportion, based on obtaining an
input for the visual objects.

5. The electronic device of claim 4,
wherein the instructions, when executed by the at least
one processor individually and/or collectively, cause
the electronic device to:
identify an event for identifying the candidate proportions; and
identify the candidate proportions in response to the
event,
wherein the event includes a change of the space, or a
change of the situation.

6. The electronic device of claim 1,
wherein the third proportion information includes a proportion corresponding to a value of a body proportion
most frequently used body proportion from among a
body proportion for each of the avatars, and
wherein the avatars are located within a designated distance from a location of the avatar corresponding to the
user of the electronic device in the space.

7. The electronic device of claim 1,
wherein the proportions include the first proportion in
which a proportion of a body to a face of an avatar is
higher than or equal to a first value, the second proportion in which a proportion of a body to a face of an avatar is lower than a second value, the third proportion in which a proportion of a body to a face of an avatar is lower than the first value and higher than or equal to the second value.

8. The electronic device of claim 1, wherein the information on the space includes at least one of a name of the space provided in the virtual environment, a role of the avatar corresponding to the user of the electronic device in the space, or a style of the space, and wherein the information on the situation includes contents taking place in the space.

9. The electronic device of claim 1, wherein the instructions, when executed by the at least one processor individually and/or collectively, cause the electronic device to:

obtain information on a virtual object located in the space;

identify fourth proportion information of an avatar required with respect to the virtual object; and identify a priority for each of the proportions based on the first proportion information, the second proportion information, the third proportion information, and the fourth proportion information.

10. The electronic device of claim 1, wherein the instructions, when executed by the at least one processor individually and/or collectively, cause the electronic device to:

obtain information on a user of the avatar corresponding to the user of the electronic device;

identify fifth proportion information of an avatar preferred by the user, based on the information on the user; and identify a priority for each of the proportions, based on the first proportion information, the second proportion information, the third proportion information, and the fifth proportion information, wherein the information on the user includes at least one of a proportion of the avatar corresponding to the user of the electronic device preferred by the user, a record for a proportion of the avatar corresponding to the user of the electronic device used by the user, or appearance of the user.

11. The electronic device of claim 1, wherein the instructions, when executed by the at least one processor individually and/or collectively, cause the electronic device to:

identify the first proportion of the avatar corresponding to the user of the electronic device, in response to identifying the second proportion;

identify whether information on the avatar corresponding to the user of the electronic device adjusted as the second proportion is stored in the memory;

obtain the avatar corresponding to the user of the electronic device with the second proportion generated by the information on the avatar corresponding to the user of the electronic device, based on the information on the avatar corresponding to the user of the electronic device being stored in the memory; and obtain the avatar corresponding to the user of the electronic device with the second proportion changed from the first proportion by applying a weight for changing from the first proportion to the second proportion to the first proportion, based on identifying that the information on the avatar corresponding to the user of the electronic device is not stored in the memory.

12. The electronic device of claim 11, wherein the instructions, when executed by the at least one processor individually and/or collectively, cause the electronic device to:

identify whether an item for the second proportion exists; and obtain the avatar corresponding to the user of the electronic device wearing the item in response to identifying that the item exists.

13. The electronic device of claim 12, wherein the instructions, when executed by the at least one processor individually and/or collectively, cause the electronic device to:

identify first mesh coordinates of the avatar corresponding to the user of the electronic device with the first proportion and second mesh coordinates of the avatar corresponding to the user of the electronic device with the second proportion, in response to identifying the item does not exist, identify relative coordinates between the first mesh coordinates and another item worn by the avatar corresponding to the user of the electronic device with the first proportion, change a size of the another item, based on the relative coordinates, and obtain the avatar corresponding to the user of the electronic device with the second proportion wearing the another item having the changed size.

14. The electronic device of claim 1, wherein the instructions, when executed by the at least one processor individually and/or collectively, cause the electronic device to:

store the information on the space, the information on the situation, and the information on the body proportions of the avatars obtained within a designated time interval in the memory; and delete information obtained within a time interval before the designated time interval from the memory, wherein a length of the designated time interval is changeable, based on a capacity of the memory.

15. A method performed by an electronic device, the method comprising, obtaining, from an external electronic device providing a virtual environment, information on a space of the virtual environment in which an avatar corresponding to the user of the electronic device is to be positioned, information on a situation related to the space, and information on body proportions of avatars positioned in the space;

identifying, first proportion information of an avatar defined by the space, second proportion information of an avatar defined by the situation, and third proportion information used by the avatars;

identifying a priority with respect to proportions for the avatars corresponding to the user of the electronic device, based on the first proportion information, the second proportion information, and the third proportion information; and displaying, through the display, the avatar corresponding to the user of the electronic device with a second proportion changed from a first proportion in the space, based on the priority.

16. The method of claim 15, the method comprising:

identifying a count for each of the proportions, based on the first proportion information, the second proportion information, and the third proportion information; and identifying the priority, based on the count for each of the proportions, wherein a priority of the first proportion is higher than a priority of the second proportion, based on a count of the first proportion being more than a count of the second proportion from among the proportions.

17. The method of claim 15, the method comprising:

identifying the priority using an artificial intelligence model, based on an input including the information on the first proportion information, the second proportion information, and the third proportion information, wherein the priority is included in an output of the artificial intelligence model.

18. The method of claim 15, the method comprising:

identifying candidate proportions having the priority higher than or equal to a reference priority from among the proportions;

displaying, through the display, visual objects having a body proportion determined according to the candidate proportions; and identifying the second proportion, based on obtaining an input for the visual objects.

19. The method of claim 18, the method comprising:

identifying an event for identifying the candidate proportions; and identifying the candidate proportions in response to the event, wherein the event includes a change of the space, or a change of the situation.

20. A non-transitory computer-readable storage medium, storing one or more programs including instructions that, when executed by at least one processor of an electronic device, the at least one processor comprising processing circuitry, individually and/or collectively, cause the electronic device to:

obtain, from an external electronic device providing a virtual environment, information on a space of the virtual environment in which an avatar corresponding to the user of the electronic device is to be positioned, information on a situation related to the space, and information on body proportions of avatars positioned in the space;

identify, first proportion information of an avatar defined by the space, second proportion information of an avatar defined by the situation, and third proportion information used by the avatars;

identify a priority with respect to proportions for the avatars corresponding to the user of the electronic device, based on the first proportion information, the second proportion information, and the third proportion information; and display, through the display, the avatar corresponding to the user of the electronic device with a second proportion changed from a first proportion in the space, based on the priority.

* * * * *